United States Patent [19]

Miyamoto et al.

[11] Patent Number: 5,351,591
[45] Date of Patent: Oct. 4, 1994

[54] FRET-SAW MACHINE

[75] Inventors: Kouichi Miyamoto; Shoji Takahashi, both of Tokyo, Japan

[73] Assignee: Ryobi Limited, Tokyo, Japan

[21] Appl. No.: 88,518

[22] Filed: Jul. 7, 1993

Related U.S. Application Data

[62] Division of Ser. No. 931,588, Aug. 18, 1992, Pat. No. 5,267,498.

[30] Foreign Application Priority Data

| Aug. 20, 1991 | [JP] | Japan | 3-065730[U] |
| Aug. 20, 1991 | [JP] | Japan | 3-208014 |
| Aug. 21, 1991 | [JP] | Japan | 3-066163[U] |
| Aug. 21, 1991 | [JP] | Japan | 3-066164[U] |
| Aug. 26, 1991 | [JP] | Japan | 3-213359 |
| Sep. 2, 1991 | [JP] | Japan | 3-070017[U] |
| Sep. 18, 1991 | [JP] | Japan | 3-074964[U] |

[51] Int. Cl.⁵ ............................................ B27B 3/10
[52] U.S. Cl. ................................. 83/768; 83/781; 83/783; 83/662
[58] Field of Search ........... 83/780, 781, 782, 783, 83/784, 785, 786, 776, 779, 751, 662, 768

[56] References Cited

U.S. PATENT DOCUMENTS

| 101,788 | 4/1870 | Tripp | 83/780 |
| 2,208,843 | 7/1940 | Hedgpeth | 83/781 |
| 2,609,016 | 9/1952 | Bush | 83/781 |
| 2,726,687 | 12/1955 | McLachlan | 83/780 |
| 3,570,351 | 3/1971 | Spengler | 83/781 |
| 3,921,489 | 11/1975 | Johansson | 83/751 |
| 5,018,420 | 5/1991 | Plomb | 83/783 |

Primary Examiner—Scott A. Smith
Attorney, Agent, or Firm—Brooks & Kushman

[57] ABSTRACT

A fret-saw machine comprises a base unit having a table on which a workpiece to be cut is placed, a frame member disposed in the base unit and secured to the table, an arm member having one end portion secured to the frame member and another end portion disposed above the table, a blade holder assembly having first and second slide holder units and first and second blade holder units, the first slide holder unit and the first blade holder units being disposed in the base unit and secured to the frame member and the second slide holder unit and the second blade holder unit being secured to another end portion of the arm member, blade supported at its both ends by the first and second blade holder units and a drive unit supported in the base unit by the frame member and connected to the first slide holder unit to drive the blade. The blade holder unit has a blade nipping member for firmly nipping the blade. A tension applying assembly is disposed to the blade holder assembly for suitably applying the tension to the blade. The blade may carry out its reciprocal motion in an inclined manner. The arm member is fastened so as to be positionally adjustable. The fret-saw machine is further provided with a blade cover having a workpiece pressing function and a rotation preventing structure for the sake of safeness.

3 Claims, 27 Drawing Sheets

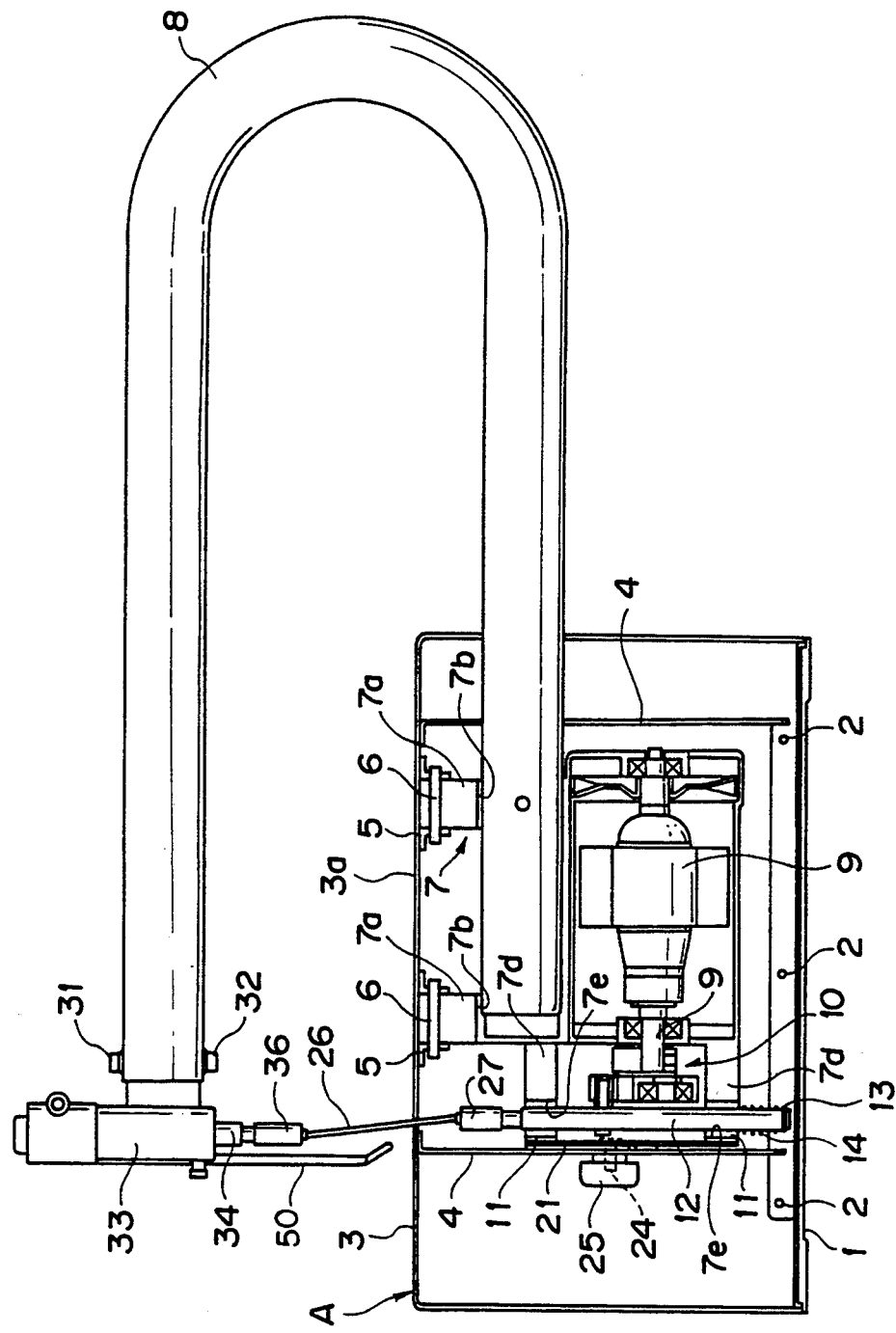

F I G. 14
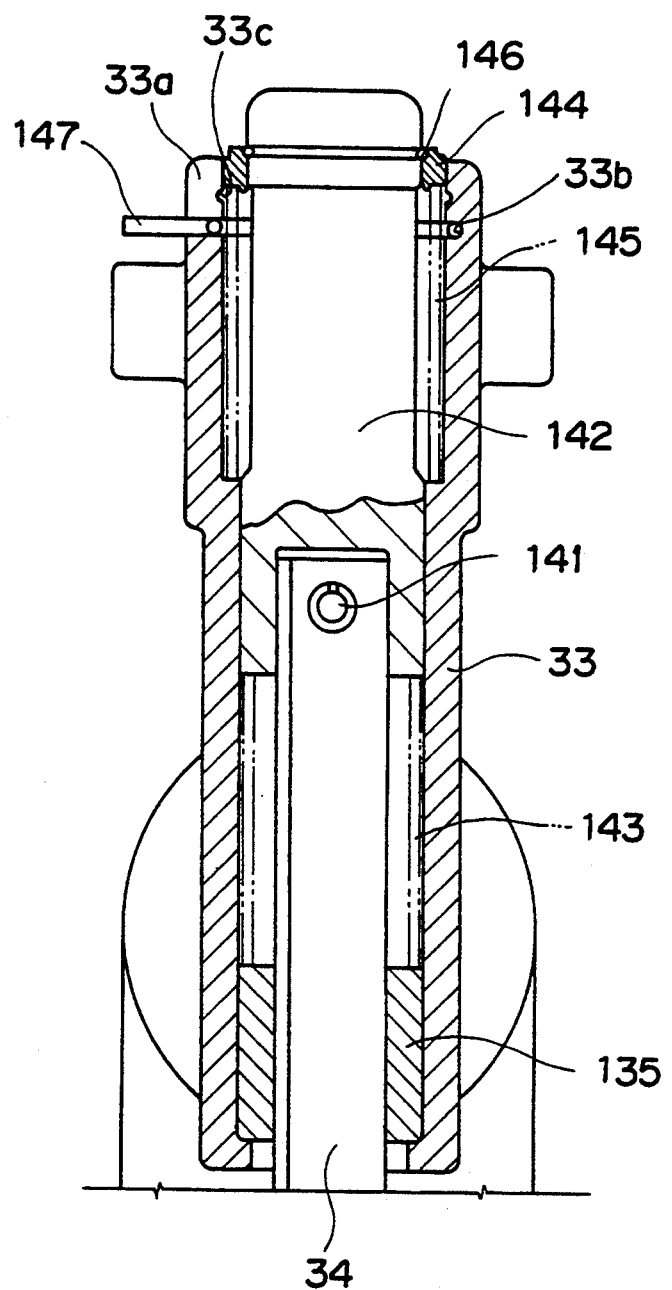

F I G. 15
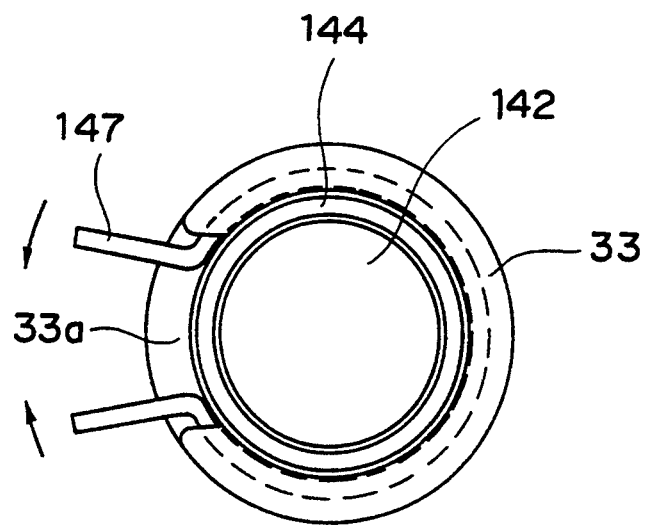

F I G. 19
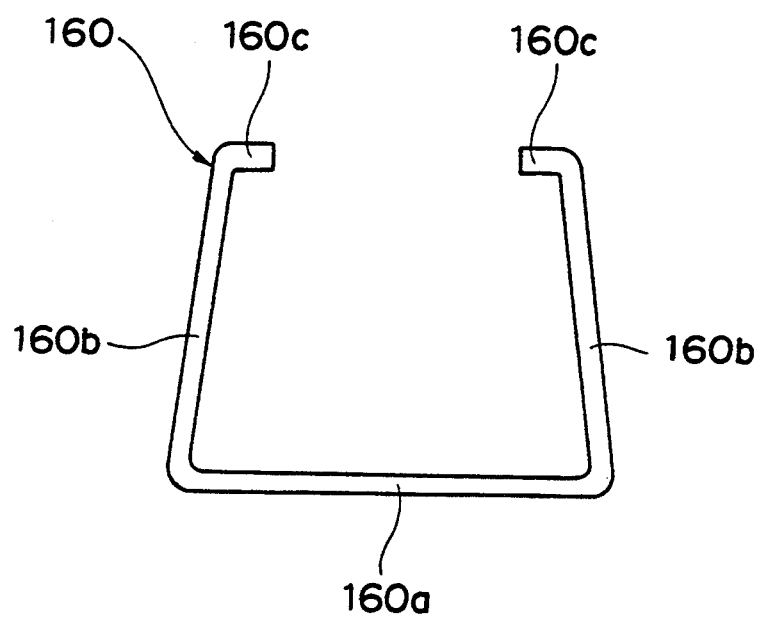

F I G. 29
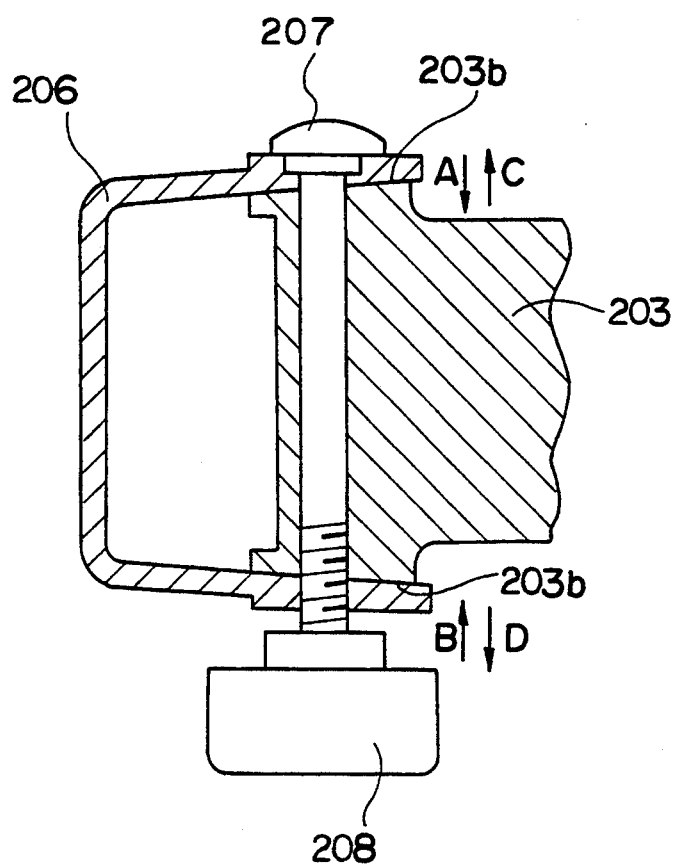

FRET-SAW MACHINE

This is a divisional of copending application(s) Ser. No. 07/931,588 filed on Aug. 18, 1992 now U.S. Pat. No. 5,267,498.

BACKGROUND OF THE INVENTION

This invention relates to a fret-saw machine provided with a blade holder unit of an improved structure for holding a fret-saw blade and with a blade cover and other associated members capable of carrying out effective, cutting work and performing an improved operation.

Generally, a fret-saw machine is provided with an elongated fret-saw blade which is set substantially perpendicularly with respect to a flat surface of a work table on which a workpiece is placed and the workpiece is cut by reciprocally driving the fret-saw blade.

The fret-saw machine generally comprises a base table, a driving unit suspended from the rear surface side of the base table to be swingable, an arm member generally having a U shape and having one end secured to a frame member disposed in the base table, an upper holder unit secured to the other end of the U-shaped arm member above the base table, a lower holder unit operatively connected to a motor accommodated in the driving unit at a portion below the base table, and a fret-saw blade having longitudinal ends held by the upper and lower holder units. In such arrangement, the fret-saw blade is adjusted in its position so that the fret-saw blade can be mode in a direction perpendicular to the plane of the base table surface when a workpiece is cut by the fret-saw blade.

Furthermore, in such arrangement, the fret-saw blade is fastened to the machine body by fastening means such as bolt and nut assembly or the like, requiring a troublesome fastening working such as loosening or clamping the bolt and nut assembly before and after the attachment of the fret-saw blade to the holder units.

In such prior art, there is provided a fret-saw machine in which the fret-saw blade can be adjusted in its positioning angle, for example, as disclosed in the Japanese Utility Model Publication No. 57-13202, which, however, discloses a structure capable of adjusting the blade attaching angle only to a predetermined angle. Therefore, it is desired to provide an fret-saw machine having an improved structure capable of adjusting the blade attaching angle to a desired optional angle.

In the foregoing, there is described a fret-saw machine in which the fret-saw blade is held substantially perpendicularly with respect to the table surface on which the workpiece to be cut is placed, and the blade supported at its both ends by the upper and lower holder units to be vertically movable. However, in such arrangement, there is a case where cut chips are not well removed, and in some case, vertical cut lines may be formed on the cut surface of the workpiece, thus providing bad finishing, and in the worst case, there may cause a case where the blade operation is stopped in engagement with the workpiece now being cut.

In order to obviate such defect, there is also provided a structure for driving the blade. Namely, a pair of parallel upper and lower arm members are swingably attached to both the end portions of the blade. According to such arrangement of the parallel swingable arms, the reciprocal motion of the blade has a component perpendicular to the table surface and a component parallel thereto during the cutting operation of the blade.

However, the fret-saw machine having such fret-saw swinging mechanism has the structure complicated for the precise angular positioning of the fret-saw blade, and the manufacturing thereof is also made complicated, requiring much time and labour.

Furthermore, in the fret-saw machine, it is necessary to stretch the fret-saw blade between the upper and lower blade holders with a predetermined tension for the cutting working. In a prior art, one end side, i.e. following blade holder side opposing to the blade drive side, of the blade is pulled to apply the tension to the blade and fastened to thus pulled state. However, in the prior art technique, it is difficult or troublesome to adjust the fastening of the screw bolt to obtain a desired tension, resulting in complicated work for an operator, thus requiring an improved blade tensioning device or assembly.

Still furthermore, in the fret-saw machine of the prior art, when it is required to change the lateral inclination of the blade with respect to the base table on which the workpiece to be cut is placed, the fastening screw is first loosened and the screw shaft is shifted along the arcuate shape of the hole into which the screw shaft is fitted thereby to move the U-shaped arm around the shaft, thus changing the lateral inclination of the blade holder unit together with the blade. However, in such arrangement, the U-shaped arm is generally secured to the frame member at its lower end portion and to the holder unit at its upper end portion, so that the positioning of the blade between the upper and lower holder units by adjusting the position of the arm is made difficult.

Still furthermore, the fret-saw blade is generally covered by a blade cover which is capable of being rotated for attaching or removing the blade, and a workpiece is supported by a pressing member for preventing the workpiece from being shifted during the cutting working, this pressing member being disposed as a separate member from the blade cover. In the conventional blade cover, there is a fear of accidental rotation of the blade cover during the cutting working, thus being dangerous, and a blade fastening structure for reliably fastening the blade cover to its holder member is also required.

SUMMARY OF THE INVENTION

An object of this invention is to substantially eliminated defects and drawbacks encountered in the prior art and to provide a fret-saw machine provided with a saw blade holder unit capable of easily mounting and dismounting the blade and firmly holding the blade with a desired attaching angle.

Another object of this invention is to provide a fret-saw machine capable of effectively cutting a workpiece without preventing the blade from engaging the workpiece cut surface and removing chips during the cutting operation.

A further object of this invention is to provide a fret-saw machine provided with a tension applying unit capable of applying a suitable tension to the blade and easily adjusting the tension.

A still further object of this invention is to provide a fret-saw machine provided with an arm member to which blade holder units are secured, capable of easily adjusting the axial alignment of these holder units by adjusting a fastening position of the arm member.

A still further object of this invention is to provide a fret-saw machine provided with a blade cover having an improved structure for safely preventing unnecessary rotation of the blade cover.

These and other objects can be achieved according to this invention, in one aspect, by providing a fret-saw machine comprising:

a base unit having a table on which a workpiece to be cut is placed:

a frame member disposed in the base unit and secured the table;

a U-shaped arm member having one end portion secured to the frame member and another end portion disposed above the table;

a blade holder means having first and second slide holder units and first and second blade holder units each secured to corresponding slide holder units, the first slide holder unit and the first blade holder units being disposed in the base unit and secured to the frame member and the second slide holder unit and the second blade holder unit being secured to another end portion of the arm member;

a blade supported at its both ends by the first and second blade holder units; and a drive means supported in the base unit by the frame member and connected to the first slide holder unit to drive the blade, at least one of the first and second blade holder units comprising a holder having a blade insertion hole and an inner hollow portion communicated with the blade insertion hole, two rolling members disposed in the hollow portion of the holder between which an end portion of the blade is clamped, a shaft portion formed on a side opposite to the blade insertion hole, the shaft portion being inserted into a slide shaft secured to corresponding one of first and second slide holders, and an operation means disposed to be axially movable with respect to the holder for supporting the rolling members so as to be shifted towards or away from each other in a direction normal to the axial direction the inner hollow portion having a pair of tapered surfaces contacting the two rolling members, respectively, the tapered surfaces being axially widened towards the shaft portion.

In this aspect, when the blade is fastened, the operation member is moved in a direction to release the pressing condition of the rolling members against the tapered surfaces of the holder. Under this condition, the blade is inserted from the blade insertion hole of the holder and clamped between the two rolling members. Thereafter, the operation member is again moved to press the rolling member against the tapered surface, thus firmly clamping the blade between the rolling members.

In another aspect, there is provided a fret-saw machine comprising:

a base unit having a table on which a workpiece to be cut is placed;

a frame member disposed in the base unit and secured to the table;

a U-shaped arm member having one end portion secured to the frame member and another end portion disposed above the table;

a blade holder means having first and second slide holder units and first and second blade holder units each secured to corresponding slide holder units, the first slide holder unit and the first blade holder units being disposed in the base unit and secured to the frame member and, the second slide holder unit and the second blade holder unit being secured to another end portion of the arm member;

a blade supported at its both ends by the first and second blade holder units; and a drive means supported in the base unit by the Frame member and connected to the first slide holder unit to drive the blade, the blade and the blade holder means are arranged so that when the blade carries out a cutting operation, the blade moves in one direction towards the workpiece and also moves in another direction apart from the workpiece.

In preferred embodiments, the blade is held with an inclination with respect to a surface of the table and the blade holder means is arranged substantially perpendicularly with respect to the surface of the table. The blade may be held substantially perpendicularly with respect to a surface of the table and the blade holder means is arranged with an inclination with respect to the surface of the table.

In this aspect, when the workpiece is cut, the slide holder units are moved reciprocally together with the blade held therebetween. During this cutting operation, the blade moves in a direction towards the workpiece when the blade is lowered and also moves in a direction apart from the workpiece when the blade is lifted, thus the reciprocal motion of the blade includes component parallel with respect to the table surface, thus providing an improved chip removing function.

In a further aspect, there is provided a fret-saw machine comprising:

a base unit having a table on which a workpiece to be cut is placed;

a frame member disposed in the base unit and secured to the table;

a U-shaped arm member having one end portion secured to the frame member and another end portion disposed above the table;

a blade holder means having first and second slide holder units and first and second blade holder units each secured to corresponding slide holder units, the first slide holder unit and the first blade holder units being disposed in the base unit and secured to the frame member and the second slide holder unit and the second blade holder unit being secured to another end portion of the arm member;

a blade supported at its both ends by the first and second blade holder units;

a drive means supported in the base unit by the frame member and connected to the first slide holder unit to drive the blade; and means disposed in the blade holder means for applying a tension to the blade, the tension applying means being disposed at least one pair of first and second blade holder units and slide holder units and comprising a first elastic member disposed between the blade holder unit and the slide holder unit for urging the blade in a pulling direction, a ring member provided for the blade holder unit to be movable, a second elastic member disposed between the ring member and the slide holder unit and an operation member engageable with the ring member, wherein the ring member is engaged with the blade holder unit to apply an urging force to the blade in the blade pulling direction when the ring member is disengaged from the operation member.

According to this aspect, the blade held by the blade holder means is usually pulled by urging force of the first and second elastic members in which the ring member is engaged with an engaging member. In a case where only the urging force of the first elastic member, the blade holder means is moved by a predetermined amount against the urging force of the first and second elastic members. Thereafter, the operation member is engaged with the ring member, whereby the ring member is not engaged with the blade holder means, the second elastic member does not urge and only the urging force of the first elastic member acts.

In a still further aspect, there is provided a fret-saw machine comprising:
- a base unit having a table on which a workpiece to be cut is placed;
- a frame member disposed in the base unit and secured to the table;
- a U-shaped arm member having one end portion secured to the frame member and another end portion disposed above the table;
- a blade holder means having first and second slide holder units and first and second blade holder units each secured to corresponding slide holder units, the first slide holder unit and the first blade holder units being disposed in the base unit and secured to the frame member and the second slide holder unit and the second blade holder unit being secured to another end portion of the arm member;
- a blade supported at its both ends by the first and second blade holder units;
- a drive means supported in the base unit by the frame member and connected to the first slide holder unit to drive the blade; and
- means for securing the U-shaped arm member in a positionally adjustable manner.

According to this aspect, when the blade is slightly inclined because of the shifting of axes of the blade holder unit and the slide holder unit, the bolt fastening the arm and the frame member is loosened to shift the arm position and the bolt fastening the arm member and the slide holder unit is also adjusted to remedy the shifting of axes of the blade holder unit and the slide holder unit.

In a still further aspect, there is provided a fret-saw machine comprising:
- a base unit having a table on which a workpiece to be cut is placed;
- a frame member disposed in the base unit and secured to the table;
- a U-shaped arm member having one end portion secured to the frame member and another end portion disposed above the table;
- a blade holder means having first and second slide holder units and first and second blade holder units each secured to corresponding slide holder units, the first slide holder unit end the first blade holder units being disposed in the base unit and secured to the frame member and the second slide holder unit and the second blade holder unit being secured to another end portion of the arm member;
- a blade supported at its both ends by the first and second blade holder units;
- a drive means supported in the base unit by the frame member and connected to the first slide holder unit to drive the blade; and
- means secured to the blade holder means for covering the blade, the blade covering means comprising a front plate and side plates integrally formed with the front plate so as to provide a box shaped shape, the side plates having one ends apart from the surface of the table on which a workpiece is placed to elastically press the workpiece against the surface of the table when the workpiece is cut.

According to this aspect, the workpiece is pressed elastically against the table by the elasticity of the blade covering means, thus safely and stably carrying out the cutting operation. The rotation of the blade covering means can be safely prevented by the engaging means.

BRIEF DESCRIPTION OF THE DRAWINGS

For a better understanding of this invention and to show how the same is carried out, reference will be made, by way of preferred embodiments, to the accompanying drawings, in which:

FIG. 10 is a side view similar to FIG. 1 but different therefrom in the blade arrangement;

FIG. 14 is an elevational section of a blade holder unit and a tensioning structure in an enlarged scale for the fret-saw machine of FIG. 1, for example;

FIG. 15 is a plan view of an operation member of the tensioning structure of FIG. 14;

FIG. 19 is a plan view of an operation member of the tensioning structure of FIG. 18;

FIGS. 28 and 29 are sectional views showing a fitting condition of the blade cover of FIG. 27.

DESCRIPTION OF THE PREFERRED EMBODIMENTS

Figure 1:
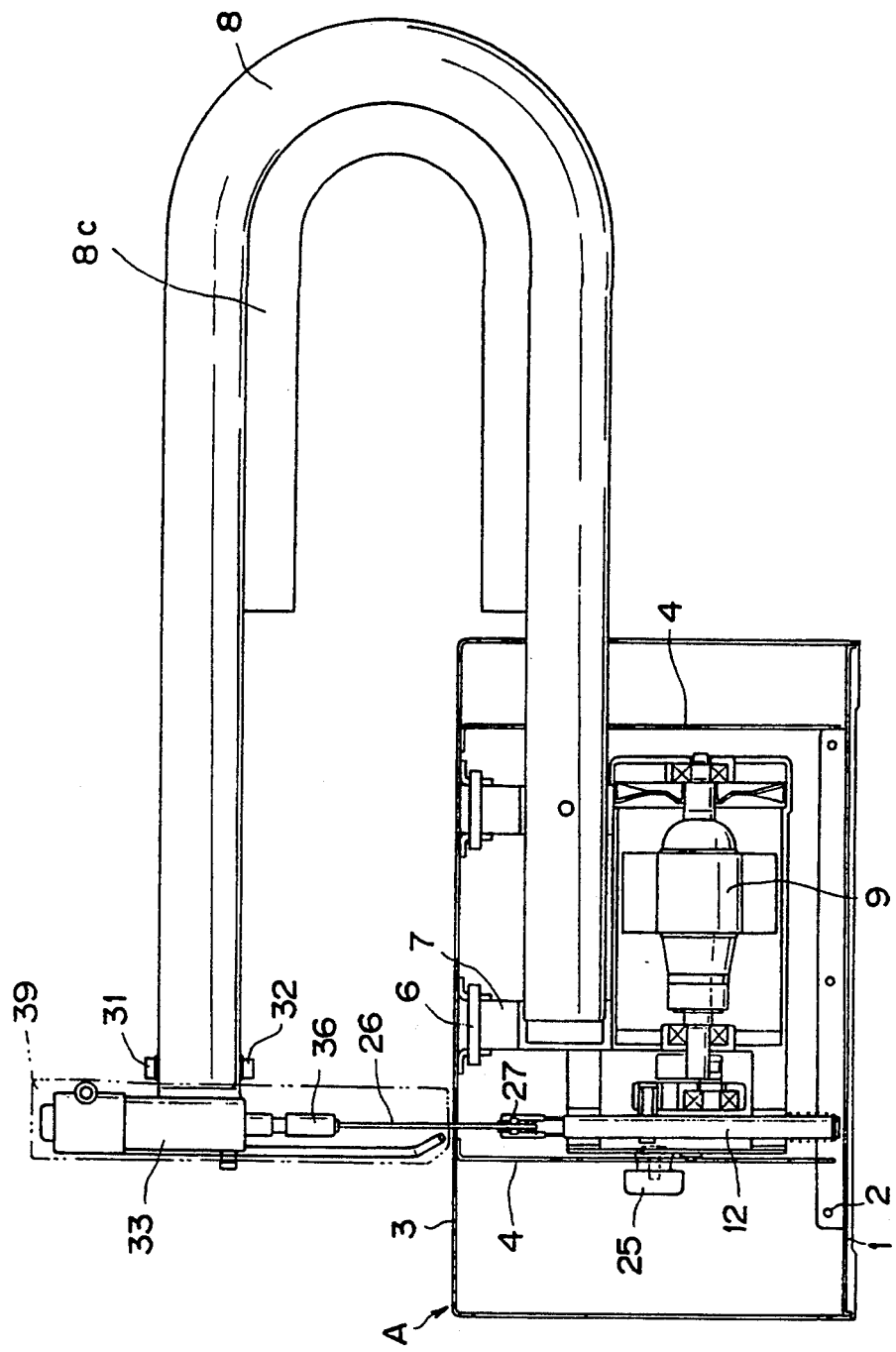
FIG. 1 is a side view showing a general structure of a fret-saw machine according to this invention.
Figure 2:
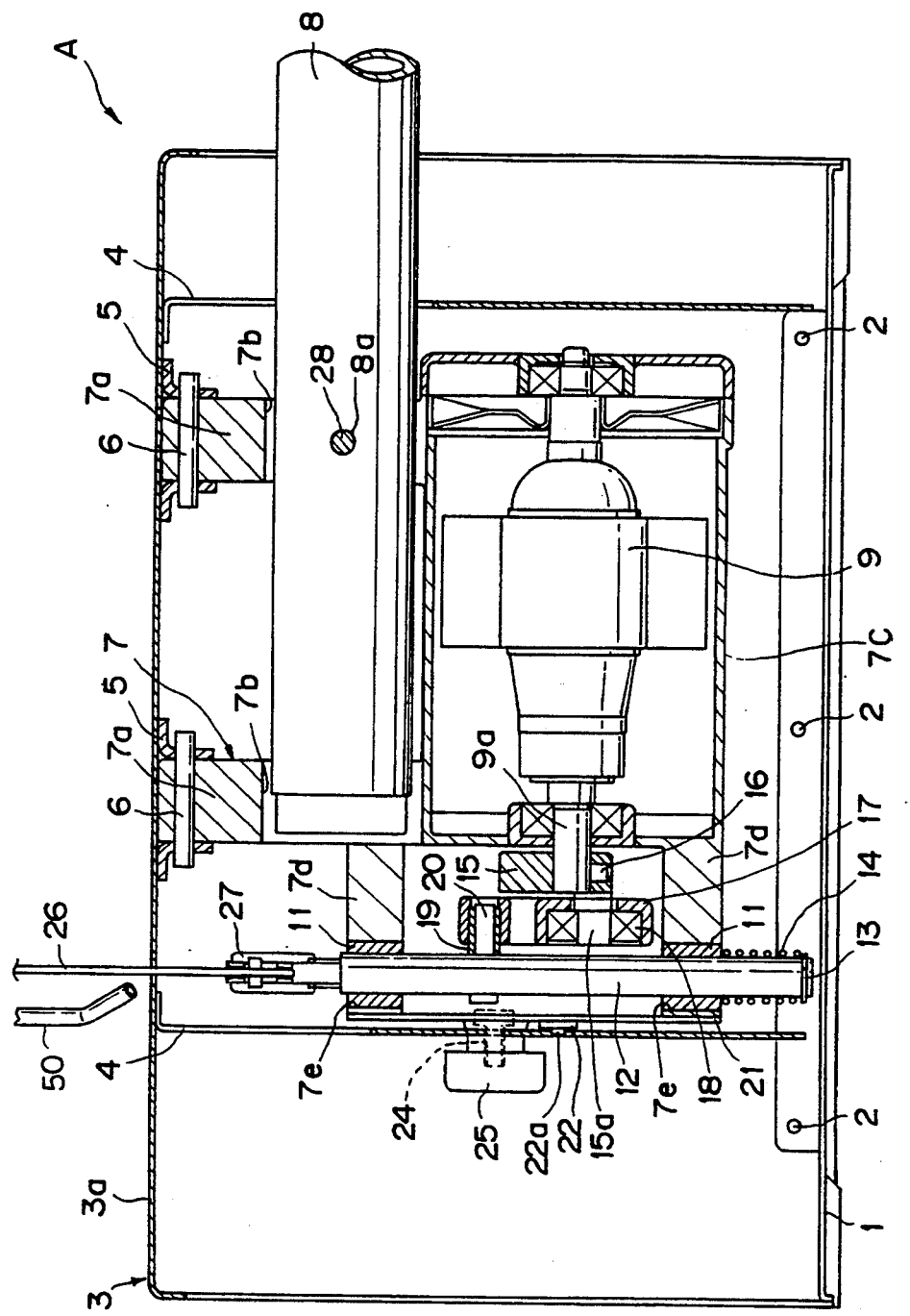
FIG. 2 is a side view of a base table of the fret-saw machine of FIG. 1.
Figure 3:
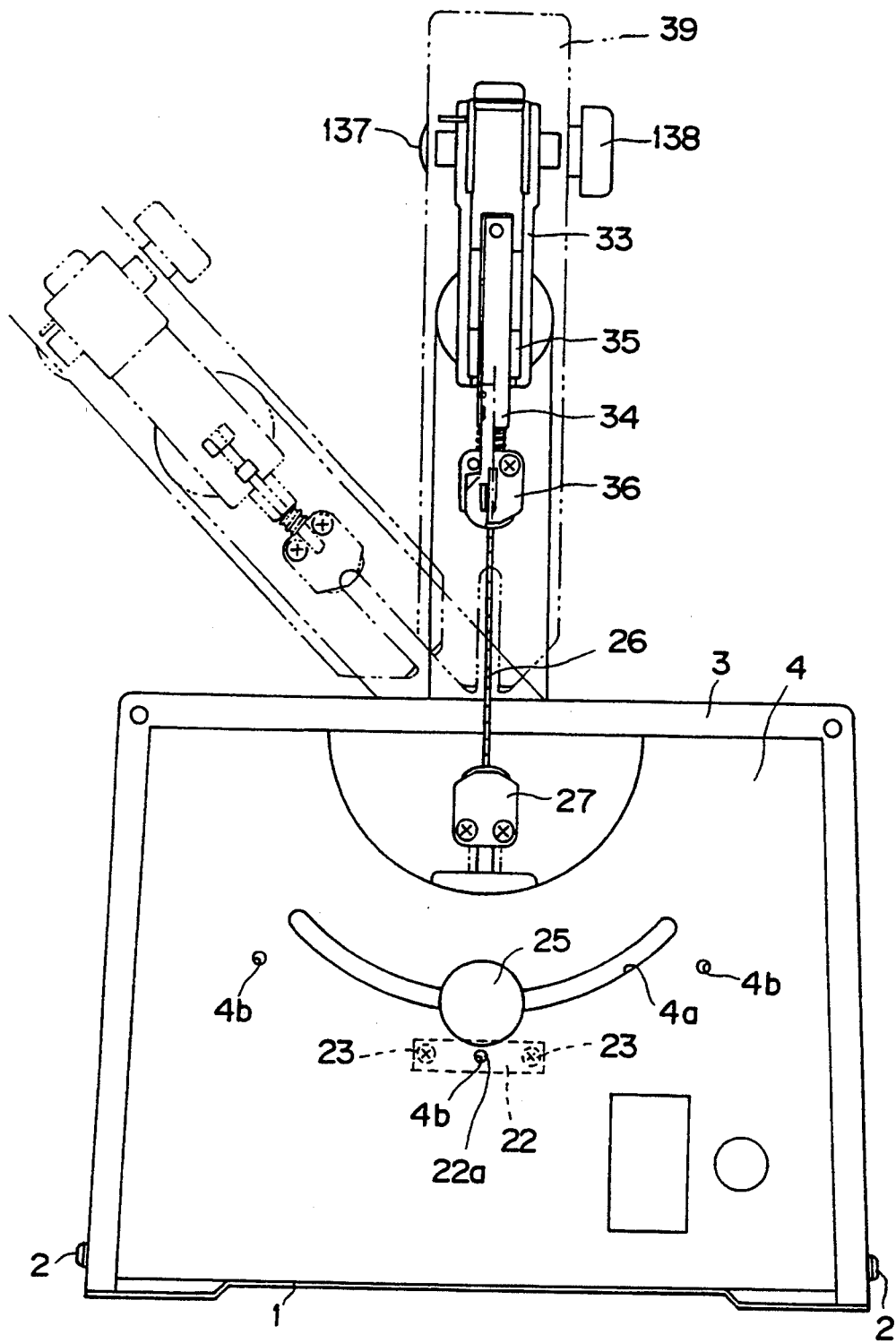
FIG. 3 is a front view of the fret-saw machine of FIG. 1.

First, referring to FIGS. 1 to 3, reference character A denotes a case like base unit including a base 1 and a table 3 secured to the base 1 by means of screws 2, 2, . . . 2, for example. The table 3 has an upper, as viewed in FIG. 2, plate 3a, and two support plates 4, 4 are suspended from the lower surface of the upper plate 3a of the table 3, and two pairs of support members 5, 5 are attached to the lower surface of the upper plate 3a between the two support plates 4, 4, in such a manner that two of the support members are opposed to each other. A frame 7 is also attached to the table 3 and includes support arms 7a, 7a are pivotally supported by the support members 5, 5, respectively, through shaft members 6, 6 as pivots for the pivotal movement of the support arms 7a, 7a of the frame 7. The support arms 7a, 7a are provided with bored holes 7b, 7b for the insertion of an arm 8 of the fret-saw machine. In the base unit A, a drive means such as electric motor 9 is supported by the support arms 7a, 7a and the drive means is accommodated in an outer casing 7c mounted to the support arms 7a, 7a.

As shown in FIG. 2, holding arms 7d, 7d are attached to one, left as viewed, of the support arms 7a, 7a and to the left end of the casing 7c of the drive means 9. The holding arms 7d, 7d are provided with holes 7e, 7e into which cylindrical metal members 11, 11 are fitted, respectively, and a lower side slide shaft 12 is fitted so as to penetrate them and extend axially, i.e. vertically as viewed so as to be axially slidable. The lower slide shaft 12 has a lower end positioned below the lower metal member 11 and a stopper ring 13 is mounted to the lower end of the lower slide shaft 12. A coil spring 14 is interposed between the metal member 11 and the stopper ring 13 so as to always urge the lower slide shaft 12 downwardly.

As shown in FIG. 3, blade cover 39 is secured to an upper slide holder 33 by means of bolt 137 and nob nut 138 for covering the blade 26 and its holding structure appearing above the surface of the table 3 of the base unit A.

Further referring to FIG. 2, a lower blade holder 27 for supporting a fret-saw blade 26 is mounted to the upper end, as viewed, of the lower slide shaft 12. On the other hand, a fly wheel 15 is fastened by a fastening screw 16 to an extended end portion of a drive shaft 9a of the drive means, such as motor 9.

An eccentric shaft 15a is disposed between the fly wheel 15 and the lower slide shaft 12 in an eccentric manner. A link 17 is rotatably secured at its one end to the eccentric shaft 15a through a bearing 18 and the other end of the link 17 is provided with a link pin 20 which is secured to the slide shaft 12 through a bearing 19. A cover plate 21 is secured to the extended ends, left ends as viewed, of the holding arms 7d, 7d by screw means, not shown, and a plate spring 22 is fastened to the cover plate 21 by means of screws 23, 23 as shown in FIG. 3. The plate spring 22 is provided with a projection 22a in a manner such that the projection 22a is always urged leftwardly so as to abut against one, left, of the support plates 4, 4.

As shown in FIGS. 2 and 3, the support plate 4 is provided with an arcuate guide slit 4a into which a bolt 24 fastened to the cover plate 21 penetrates, and a nob 25 is screwed to the bolt 24, whereby the frame 7 can be positioned by the clamping operation of the nob 25. The lateral inclination of the blade 26 and the associated members can be adjusted by adjusting the nob 25 in the slit 4a with a desired angle. The left side support plate 4 is provided with several set holes 4b, 4b, 4b into which the projection 22a of the plate spring 22 is engaged to facilitate the positioning of the frame 7. To the frame is secured one end of the arm 8 having U shape in its side view, and to the other end of the arm 8 is secured the upper slide holder 33. On the slide holder 33, as shown in FIG. 2, is mounted an upper slide shaft 34 through a metal member 35 to be vertically movable or slidable. An upper blade holder 36 is mounted on the upper end of the upper slide shaft 34. The blade 26 is supported, under tension, at its both ends between the lower blade holder 27 and the upper blade holder 36.

The upper and lower blade holder units 36 and 27 may have substantially the same structure, and accordingly, the upper blade holder unit 36 will be described hereunder.

Figure 4:
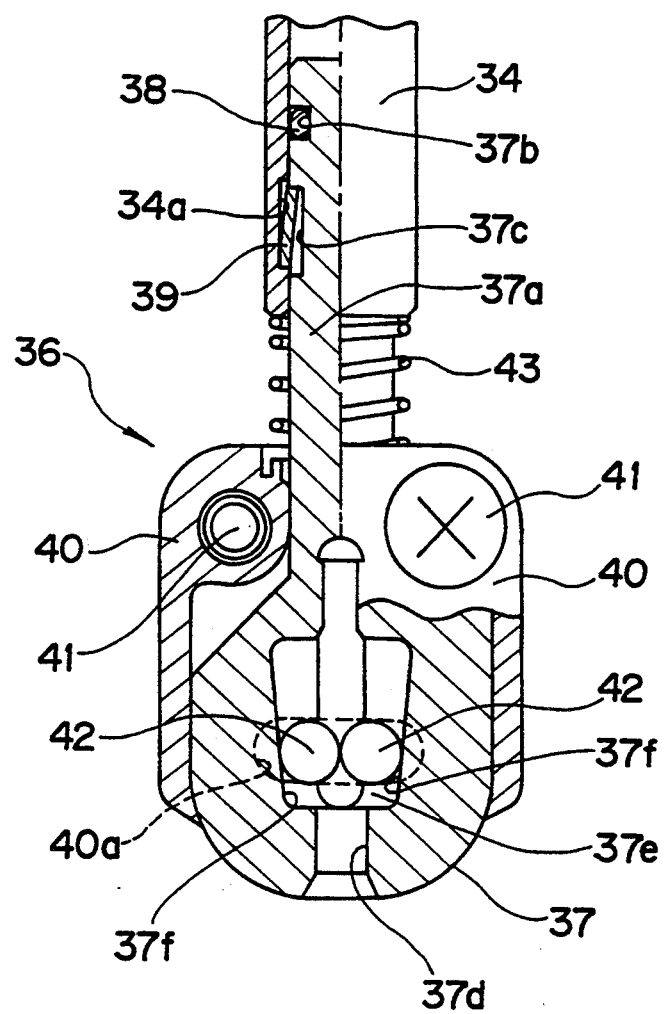
FIG. 4 is a front sectional view of a blade holder unit of the fret-saw machine according to one embodiment of this invention.

First, referring to FIG. 4, the holder unit 36 comprises a holder 37 having a shaft portion 37a which is fitted into the upper slide shaft 34. The shaft portion 34a is provided with two circumferential grooves 37b and 37c, and an O-ring 38 is fitted to one 37b of the circumferential grooves in abutment against an inner peripheral wall of the slide shaft 34. A C-shaped ring 39 is on the contrary fitted into the other circumferential groove 37c so that the C-ring is engaged with a stepped groove 34a formed on the inner wall of the upper slide shaft 34 so as to prevent the holder 37 from falling out of the upper slide shaft 34. The holder 37 is provided with a blade insertion hole 37d an end portion, downward end as viewed, opposing to the shaft portion 37a. The holder 37 is further provided with an inner hollow portion 37e which is communicated with the blade insertion hole 37d. The inner hollow portion 37e has a tapered surfaces 37f, 37f each having downward inclination as viewed towards the blade insertion hole 37d.

Figure 5:
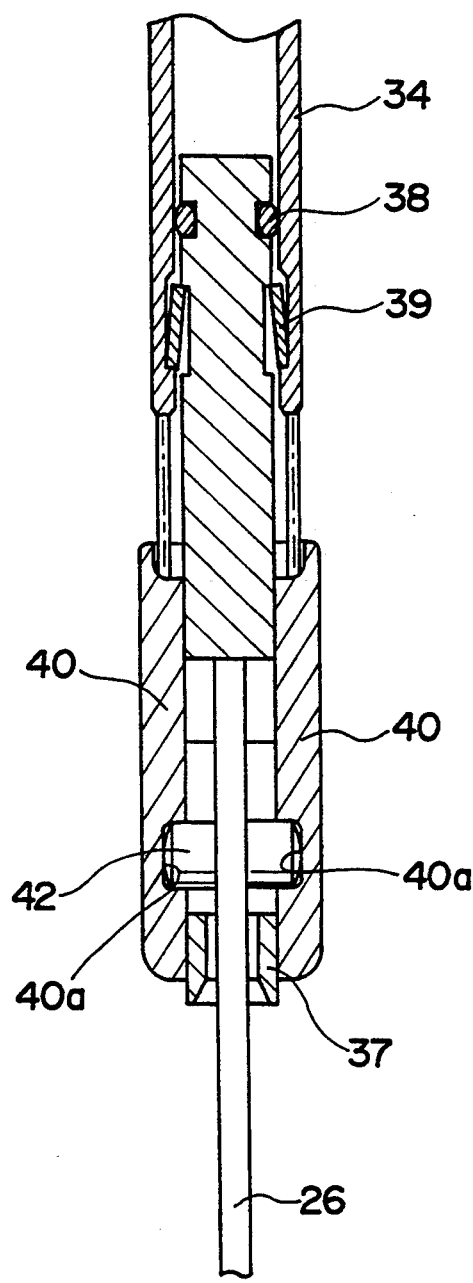
FIG. 5 is a side sectional view of the blade holder unit of FIG. 4.
Figure 6:
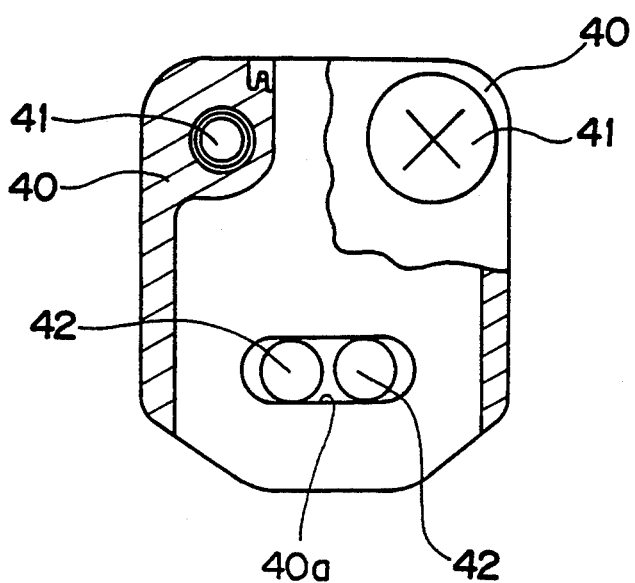
FIG. 6 is an illustrated section of a nip portion of the blade holder unit of FIG. 4.

As shown in FIG. 5, a pair of nip members 40, 40 are disposed as operation members so as to slidably abut against the holder 37 at its lateral portions as viewed. The nip members 40, 40 are secured to the holder 37 by means of screws 41, 41 as shown in FIG. 4. Slots 40a, 40a are formed on the respective nip members 40, 40 at facing portions with each other and tubular rolling members 42, 42 are fitted at portions into the slits 40a, 40a, respectively, to be rotatable as shown in FIG. 5, and other portions of the rolling members 42, 42 are accommodated in the inner hollow portion 37e of the holder 37 in abutment against the tapered surfaces 37f, 37f. A coil spring 43 is interposed between the nip members 40, 40 and the lower end of the upper slide shaft 34 so that the downward urging of the nip members 40, 40 is restricted by the mutual abutment of the rolling members 42, 42 and the abutment of the rolling members 42, 42 against the tapered surfaces 37f, 37f.

The attachment of the fret-saw blade 26 to the upper holder unit 36 of the structure described above will be performed in the following manner.

First, the nip members 40, 40 are moved upwardly, as viewed in FIG. 4, against the urging force of the coil spring 43. Then, two rolling members 42, 42 supported by the slots 40a, 40a are also moved upward in accordance with the upward movement of the nip members 40, 40. Due to this upward movement of the rolling members 42, 42, the pressed condition thereof against the tapered surfaces 37f, 37f is released to thereby allow the rolling members 42, 42 to be movable along the slots 40a, 40a, respectively, that is, a clearance is formed between these two rolling members 42, 42. Under this state, the fret-saw blade 26 is inserted and fitted into the blade insertion hole 37d formed in the holder 37 to thereby nip the blade 26 in the clearance between the rolling members 42, 42. Next, when the nip members 40, 40 are moved downward by the urging force of the coil spring 43, the rolling members 42, 42 are also moved downward and pressed against the tapered surfaces 37f, 37f of the inner hollow portion of the holder 37, thus the blade 26 being firmly clamped between the two rolling members 42, 42.

Figure 7:
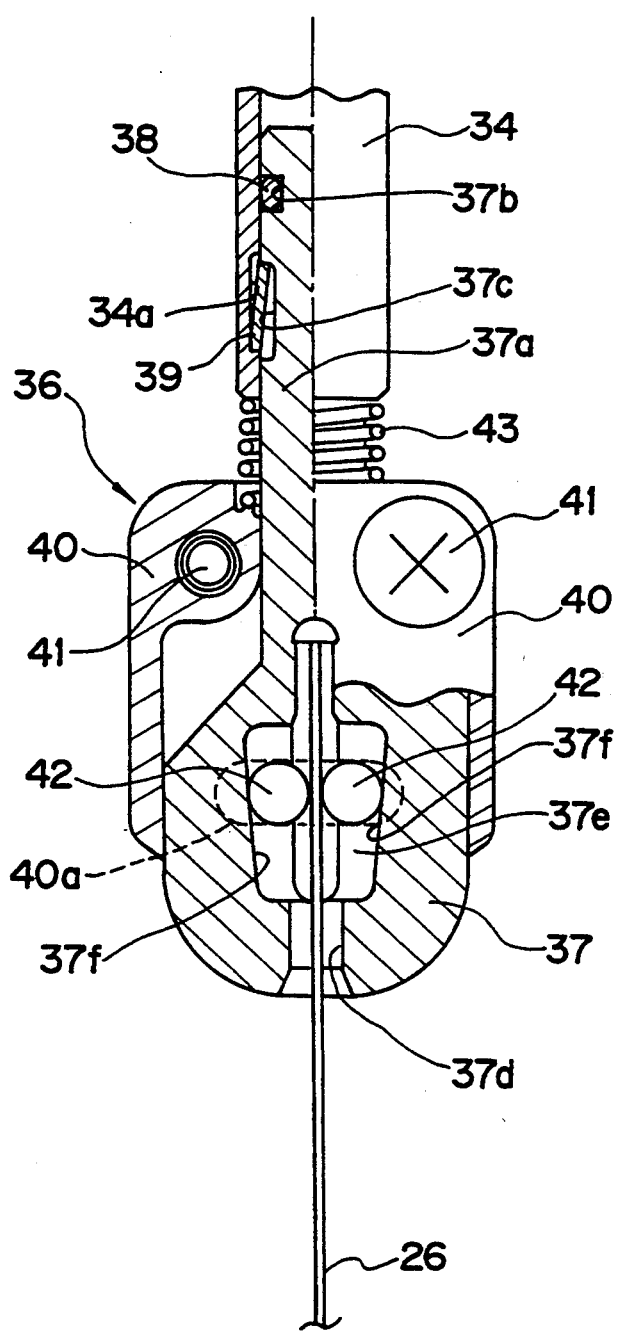
FIG. 7 is a front sectional view similar to FIG. 4 but different in its operational position.

On the contrary, when the blade-26 is removed, as shown in FIG. 7, the nip members 40 are moved upwardly as viewed to release the pressed condition of the rolling members 42 against the tapered surfaces 37f. The blade 26 is then removed from the upper blade holder unit 36 by pulling it downward as viewed, and the nip members 40 is moved downward by the urging force of the coil spring 43, thus removing the fret-saw blade 26.

The lower blade holder unit 27 may be also composed of the members or elements corresponding to those of the upper blade holder unit 36 for the easy assembling or removing of the fret-saw blade to the upper and lower holders. In an alternation, either one of the upper or lower blade holder may be composed of the described structure.

In the fret-saw blade assembling working, it may be required to change or adjust the attaching angle of the fret-saw blade 26 to be attached to the upper and lower blade holder units 36 and 27, and such angle adjusting manner will be described hereunder further with reference to FIGS. 8 and 9.

When it is required to adjust the attaching angle of the fret-saw blade 26, the nip members 40, 40 of the upper and lower blade holder units 36 and 27 are nipped and rotated by an operator in a direction shown in FIG. 7. At this time, since the holder 37 is supported by the O-ring 38 with a pressing force to be rotatable when a rotating force is applied to the upper slide shaft 34, the holder 37 is made rotatable with respect to the upper slide shaft 34 as shown in FIG. 5. During the supporting operation, the attaching angle of the holder 37 with the fret-saw blade 26 fitted can be adjusted easily by stopping the rotation of the holder to a portion having a desired angle. During the cutting working of the blade 26, the blade holder units 27 and 36 are reciprocated perpendicularly with respect to the table 3, but a large rotation force is not applied to the holder 37 and the rotation of the holder 37 is suppressed by the pressing force of the O-ring 38.

Further with reference to FIG. 8, there is described a manner that the holder 37 can be positioned to an optional position with a desired attaching angle.

Figure 8A:
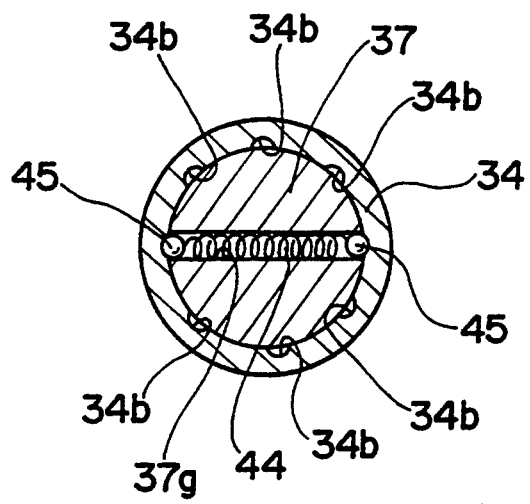
FIGS. 8A and 8B are cross section and elevational section of a slide holder of one example provided with elements for holding the blade with a desired angle position.

A hole or bore 37g is formed to a proper portion of the holder shaft portion 37a of the holder 37 so as to extend in a substantially diameter direction of the holder shaft 37a in its cross section as shown in FIG. 8A. A coil spring 44 is fitted into the through hole 37g and balls 45, 45 are disposed between both the ends of the fitted coil spring 44 and the inner peripheral surface of the upper slide shaft 34 to press the balls 45, 45 outward the shaft portion 37a. A plurality of recesses 34b, 34b, ... 34b are circumferentially formed to the inner peripheral surface of the upper slide shaft 34 so that the balls 45, 45 fitted in the through hole 37g are engaged with the recesses 34b, 34b, ... 34b.

Figure 8B:
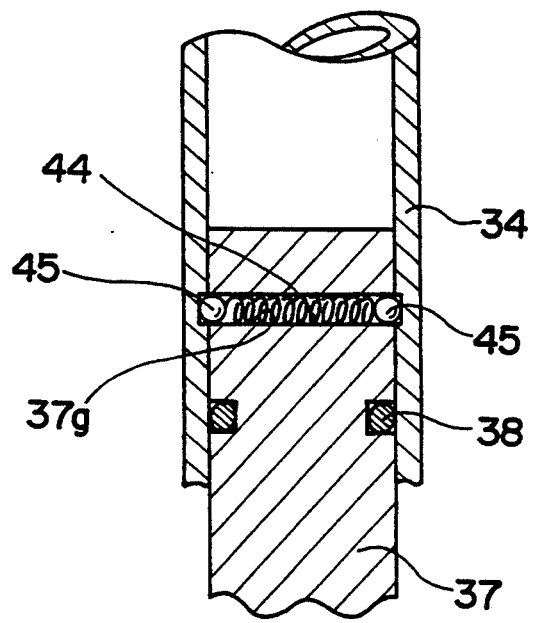

When the holder 37 is rotated, the balls 45, 45 are once released from the recesses 34b, 34b now engaged and further rotated till the balls are again engaged with the adjacently formed recesses 34b, 34b, thus positioning the holder 37. This positioning engagement will be confirmed by an operater in his finger feeling. In this operation, the holder 37 is supported by the O-ring 38 to the upper slide shaft 34 as shown in FIG. 8B.

Figure 9A:
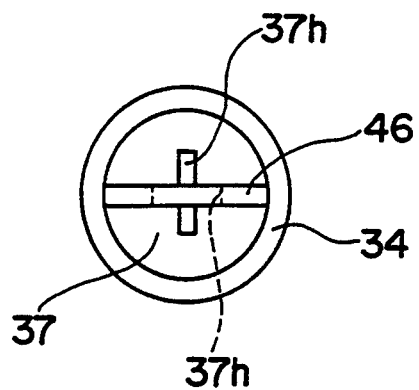
FIGS. 9A and 9B are also cross section and elevational section of a slide holder of another example provided with elements for holding the blade with a desired angle position.
Figure 9B:
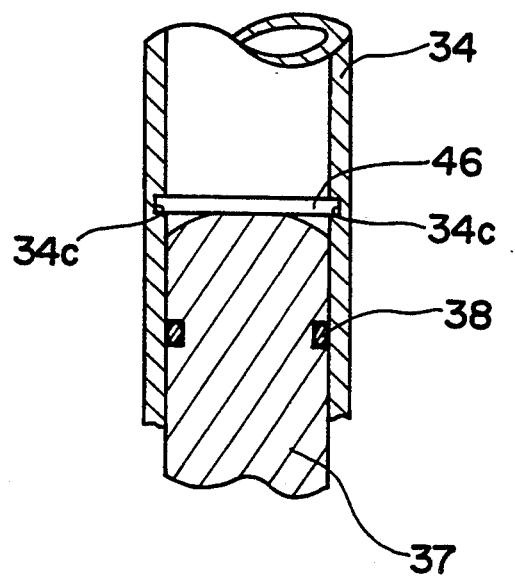

FIG. 9 is a modified example of a structure for the positioning of the holder 37.

Referring to FIG. 9, two grooves 34c, 34c formed in the inner peripheral surface of the upper slide shaft 34 at opposing positions and an elongated elastic member 45 is fitted at its both ends to the grooves 34c, 34c. The shaft portion 37a of the holder 37 has an end face having a curved surface and a groove 37h having a cross shape in a plane is formed at the end face of the shaft portion 37a, and the elastic member 46 can be engaged with the cross groove 37h. When the holder 37 is rotated, the elastic member 46 is flexed upward as viewed at its intermediate portion and hence the elastic member 46 is disengaged from the groove 37, thus becoming rotatable. In this modified example, the holder 37 is firmly supported on the upper slide shaft 34 through the O-ring; 38.

In the foregoing embodiment, there is described a fret-saw machine provided with a fret-saw blade supported substantially perpendicularly with respect to the table surface on which a workpiece to be cut is placed. However, another embodiment in which the fret-saw blade is supported in an inclined manner with respect to the table surface will be described hereunder with reference to FIGS. 10 and 13.

Figure 11:
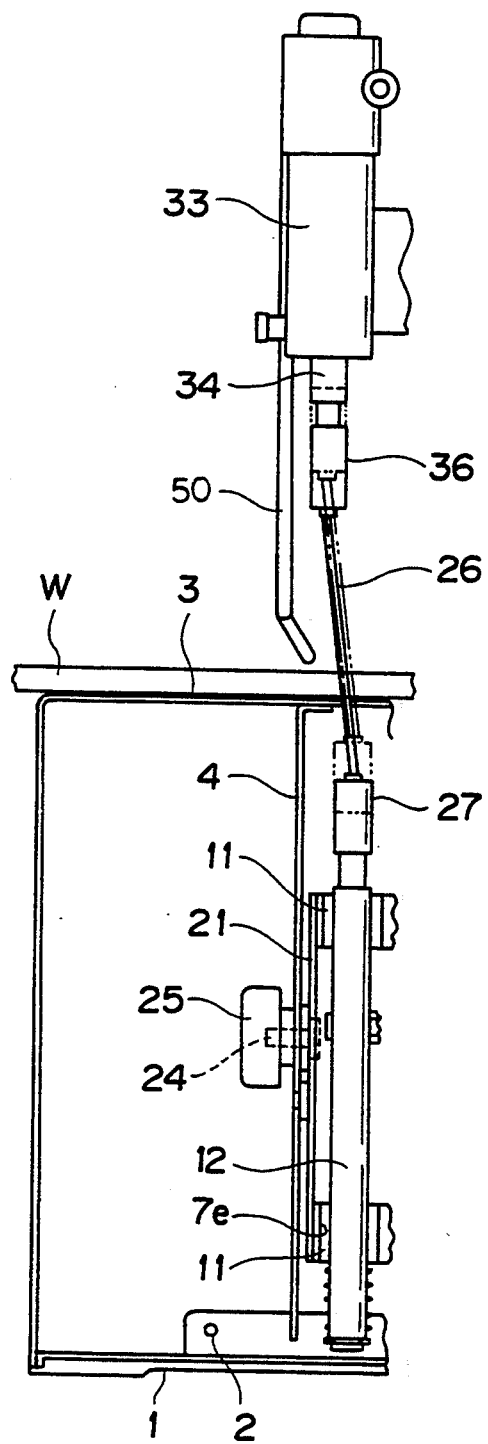
FIG. 11 is an enlarged side view of a blade holding structure of FIG. 10.

First, referring to FIGS. 10 and 11, in which like reference numerals are added to elements and members corresponding to those shown in FIGS. 1 and 3 and detailed explanation is now omitted herein. The embodiment shown in FIGS. 10 and 11 is essentially different from the embodiment of FIG. 1 in the arrangement of the fret-saw blade 26.

Namely, in this embodiment, the lower holder unit 27 and the upper holder unit 36 are shifted in its alignment in a direction along which the workpiece W placed on the surface of the table 3 moves, and such shifting may be easily be done by, for example, changing the mounting position of the lower slide shaft 12 or the upper slide holder 33, or other member.

In FIG. 10, a reference numeral 50 is an air nozzle connected to a compressed air supply source for blasting away chips formed during the cutting operation of the fret-saw blade 26 by blasting the compressed air.

In the cutting operation of the fret-saw machine of FIG. 10, when the drive means such as motor 9 is driven, the drive shaft 9a is rotated, and hence, the lower slide shaft 12 operatively coupled with the drive shaft 9a is rotated, and hence, the lower slide shaft 12 operatively coupled with the drive shaft 9a through a power transmission mechanism 10 is driven to linearly move the lower holder unit 27. The linear motion of the lower holder unit 27 is transmitted to the follower, i.e. upper, holder unit 36 through the fret-saw blade 26 held between the lower and upper holder units 27 and 36. During this linear and reciprocal motion of the blade 26, the blade 26 moves reciprocally as shown in FIG. 11 with solid and chain lines, and as shown, the reciprocal motion has an inclination, not perpendicular, with respect to the surface of the table 3 on which the workpiece W to be cut is placed. Accordingly, the reciprocal motion of the blade 26 has a component perpendicular to the table surface and a component lateral thereto.

Accordingly, when the workpiece W is cut, the blade 26 moves towards the workpiece during the cutting working of the blade 26; that is, the lowering motion of the blade from the chain line to the solid line shown in FIG. 11, thus improving the cutting performance. On the contrary, during the lifting motion of the blade 26; that is, the motion from the solid line to the chain line, the blade 26 moves in a direction apart from the workpiece W, thus the chip being easily removed and engaging of the blade with the workpiece W being effectively prevented.

Figure 12:
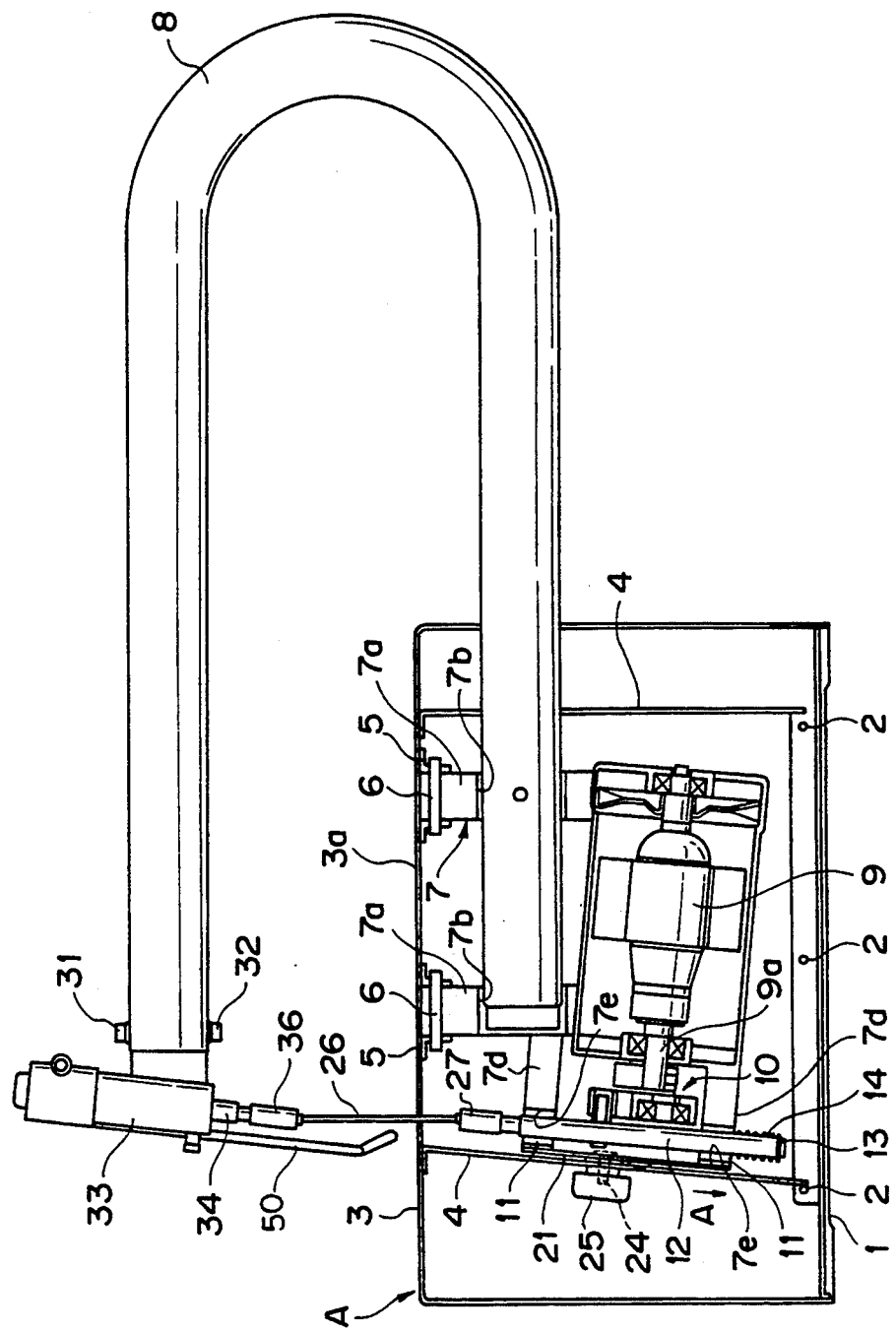
FIG. 12 is a side view similar to FIG. 1 or 10 but different therefrom in the blade arrangement.
Figure 13:
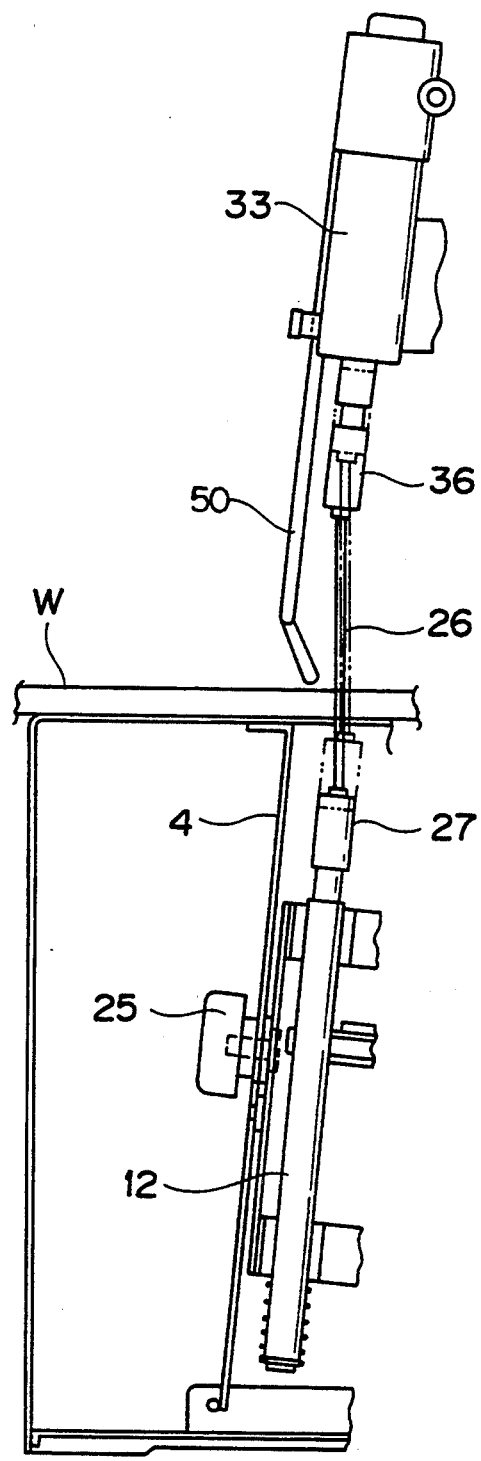
FIG. 13 is an enlarged side view of a blade holding structure of FIG. 12.

FIGS. 12 and 13 represent a modification of the embodiment shown in FIGS. 10 and 11, in which like reference numerals are added to elements and members corresponding to those of FIGS. 10 and 11.

This modified embodiment of FIGS. 12 and 13, the fret-saw blade 26 is arranged substantially perpendicularly with respect to the surface of the table 3 on which the workpiece W is placed, but the blade supporting mechanism is inclined with respect to the surface of the table 3 of the base unit A.

Namely, referring to FIG. 12, one of the support arms 7a, 7a has a length longer than that of other. That is, the right side, as viewed, support arm 7a has a lower end portion positioned below the lower end of the other support arm 7a, left side as viewed. In other words, the support arm 7a on the side towards which the workpiece moves during cutting operation has an elongated length. The drive unit 9 is attached to the lower end portion of the support arms 7a, 7a, so that the drive means 9 is mounted in the inclined manner such that the left side end, as viewed, i.e. the fret-saw blade side, of the drive means inclines leftwardly upwardly. Further, the holding arms 7d, 7d have the same length with each other and extend parallel to the drive shaft 9a of the drive means 9, so that the lower slide shaft 12 is mounted to the front end of the support arms 7d in an inclined manner with respect to the table surface.

In the similar manner, the upper assembly including the upper holder unit 36, the slide shaft 34 and the slide holder 33 are also inclined with substantially the same inclination as that of the lower assembly including the lower holder unit 27 and the lower slide shaft 12. This arrangement can be easily adapted by mounting the upper slide holder 33 to the end portion of the U-shaped arm 8 in an inclined manner.

In the cutting operation of the fret-saw machine of FIG. 12, when the drive means such as motor 9 is driven, the drive shaft 9a is rotated, and hence, the lower slide shaft 12 operatively coupled with the drive shaft 9a through a power transmission mechanism 10 is driven to linearly, but with inclination with respect to the table surface, move the lower holder unit 27. The linear motion of the lower holder unit 27 is transmitted to the follower, i.e. upper, holder unit 36 through the fret-saw blade 26 held between the lower and upper holder units 27 and 36. During this linear and reciprocal motion of the blade 28, the blade 26 moves reciprocally as shown in FIG. 13 with solid and chain lines, and as shown, the reciprocal motion is performed in a shifted manner, not stationarily, with respect to the surface of the table 3 on which the workpiece W to be cut is placed. Accordingly, the reciprocal motion of the blade 26 has a component perpendicular to the table surface and a component lateral thereto.

Accordingly, when the workpiece W is cut, the blade 26 moves toward the workpiece during the cutting working of the blade 26; that is, the lowering motion of the blade from the chain line to the solid line shown in FIG. 13, thus improving the cutting performance. On the contrary, during the lifting motion of the blade 26; that is, the motion from the solid line to the chain line, the blade 26 moves in a direction apart from the workpiece W, thus the chip being easily removed and engaging of the blade with the workpiece W being effectively prevented.

In the embodiments represented by FIGS. 10 to 13, both the ends of the fret-saw blade 26 are supported and held by the upper and lower blade holder units 36 and 27 with the blade 26 stretched therebetween under tension. The holder units 27 and 36 may be constructed so as to have substantially the same structure as that shown in FIGS. 4 to 9 representing the first embodiment. In such modification, it may be, however, necessary to slightly bend both the ends of the blade 26 to be inserted and fitted into the holder 37 of the blade holder unit 27 or 36 so that the inserted end extends substantially axially. Other than this point, the structure of the holder units of the latter mentioned embodiment is not different from the holder units of the first mentioned embodiment.

In a further aspect of the present invention, there is provided a fret-saw machine having a blade tension unit or assembly. The general structure of the fret-saw machine is substantially the same as that shown in FIGS. 1 to 3, in which the blade 26 is supported at its both ends by the upper and lower blade holder units 36 and 27. The blade tension unit according to this invention will be described hereunder with reference to FIGS. 14 to 20.

Referring to FIG. 14, a push-holder 142 is fitted to the hollow upper slide shaft 34 through a spring pin 141 in a manner such that the upper end, i.e. head portion, of the push-holder 142 slightly projects over the upper end of the slide holder 33. A coil spring 143 is interposed between the push-holder 142 and a metal member 135, which is also fitted in the hollow slide shaft 34, to urge the push-holder 142, i.e. the upper slide shaft 34 upwardly as viewed in FIG. 14. A ring collar 144 is fitted movably to the upper end side of the push-holder 142 and a coil spring 145 is also interposed between the ring collar 144 and the slide holder 33 to upwardly urge the collar 144. The ring collar 144 is held or engaged by a C-shaped ring 146 provided for the push-holder 142.

The slide holder 33 has its upper end to which a notch 33a is formed by partially cutting away a peripheral portion of the slide holder 33, and an escape groove 33b is also formed in the slide holder 33 at an inner wall portion thereof at a portion corresponding in height to the location of the notch 33a. To the escape groove 33b is fitted an engaging ring 147 which is urged in a diameter direction so as not to project over the inner-peripheral wall of the slide holder 33. The engaging ring 147 has both ends projecting outward from the slide holder 33 as shown in FIG. 15. An engaging groove 33c is further formed in the inner peripheral wall of the slide holder 33 at a portion above the escape groove 33b, and the engaging groove 33c has a depth slightly smaller as that of the escape groove 33b, the engaging groove 33c being also engageable with the engaging ring 147.

As stated before, the blade cover 39 may be fastened to the upper slide holder 33 by means of the bolt 137 and the nob nut 138.

In the actual operation, the fret-saw machine is operated as mentioned with reference to the embodiment of FIGS. 1 to 3. In this operation, according to this embodiment, however, the blade tension is adjusted as follows.

Figure 16:
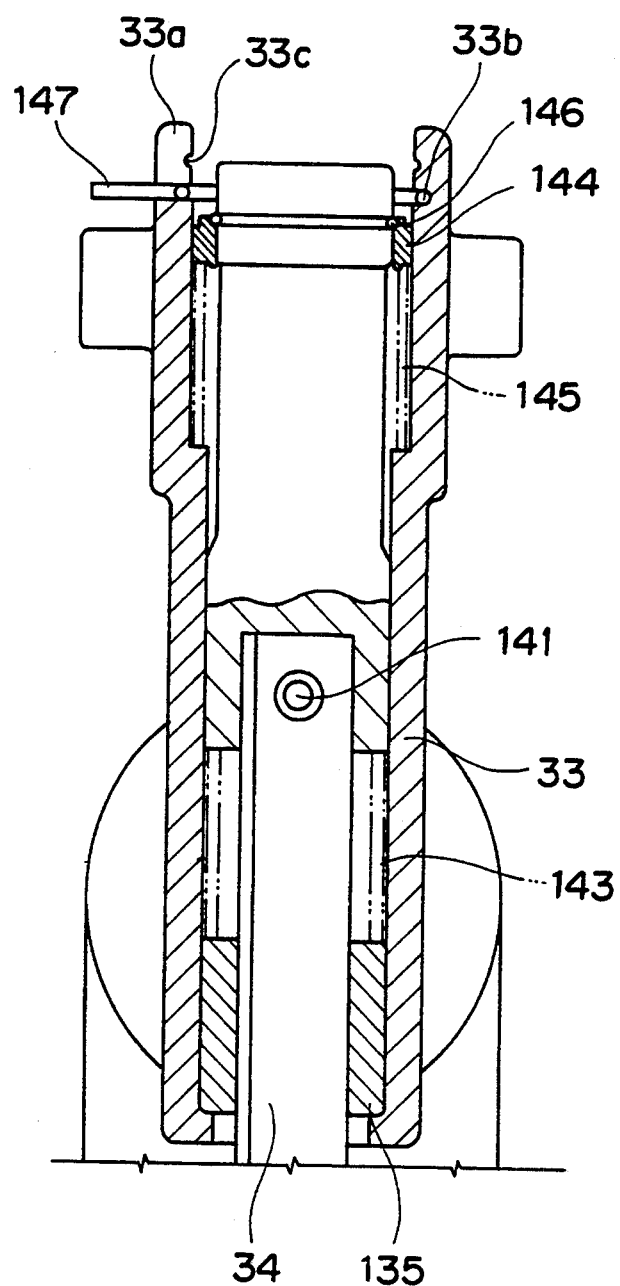
FIGS. 16 and 17 are plan views similar to FIG. 14 but different in an operating position.

When the fret-saw blade 26 is held by the lower blade holder unit 27 and the upper blade holder unit 36, the blade 26 is stretched through the push-holder 142, the spring pin 141, the upper slide shaft 34 and the upper blade holder 36 under tension through the coil springs 143 and 145. In a case where it is desired to stretch the blade 26 with relatively small tensioning force, the push-holder 142 is depressed downward as viewed in FIG. 14 against the urging force of the coil springs 143 and 145 to a portion at which the upper portion of the ring collar 144 is positioned below the escape groove 33b as shown in FIG. 16.

Figure 17:
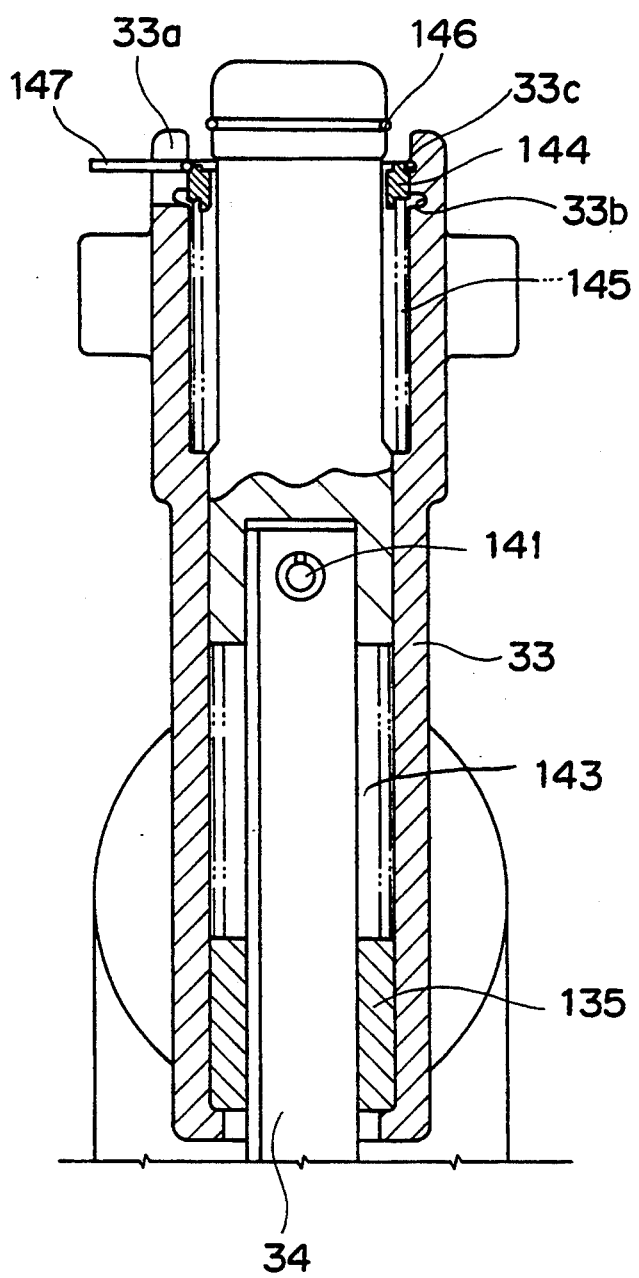

Under the described condition, the diameter of the engaging ring 147 is contracted by gripping both the ends of the engaging ring 147 as shown in FIG. 15 with arrow, whereby the engaging ring 147 is disengaged from the escape groove 33b. The engaging ring 147 is then moved upward to engage the engaging groove 33c. Thereafter, when the push-holder 142 is moved upward as shown in FIG. 16 by the urging force of the coil springs 143 and 145, the ring collar 144 is engaged with the engaging ring 147 now projecting over the inner peripheral surface of the push-holder 142, thus preventing it from moving upward, but the push-holder 142 is moved upward by the urging force of the coil spring 143 as shown in FIG. 17. Accordingly, since the ring collar 144 is held with the engagement with the C-shaped ring 146 being released, only the urging force of the coil spring 143 is applied to the push-holder 142 and any urging force of the coil spring 145 is not applied thereto.

Figure 18:
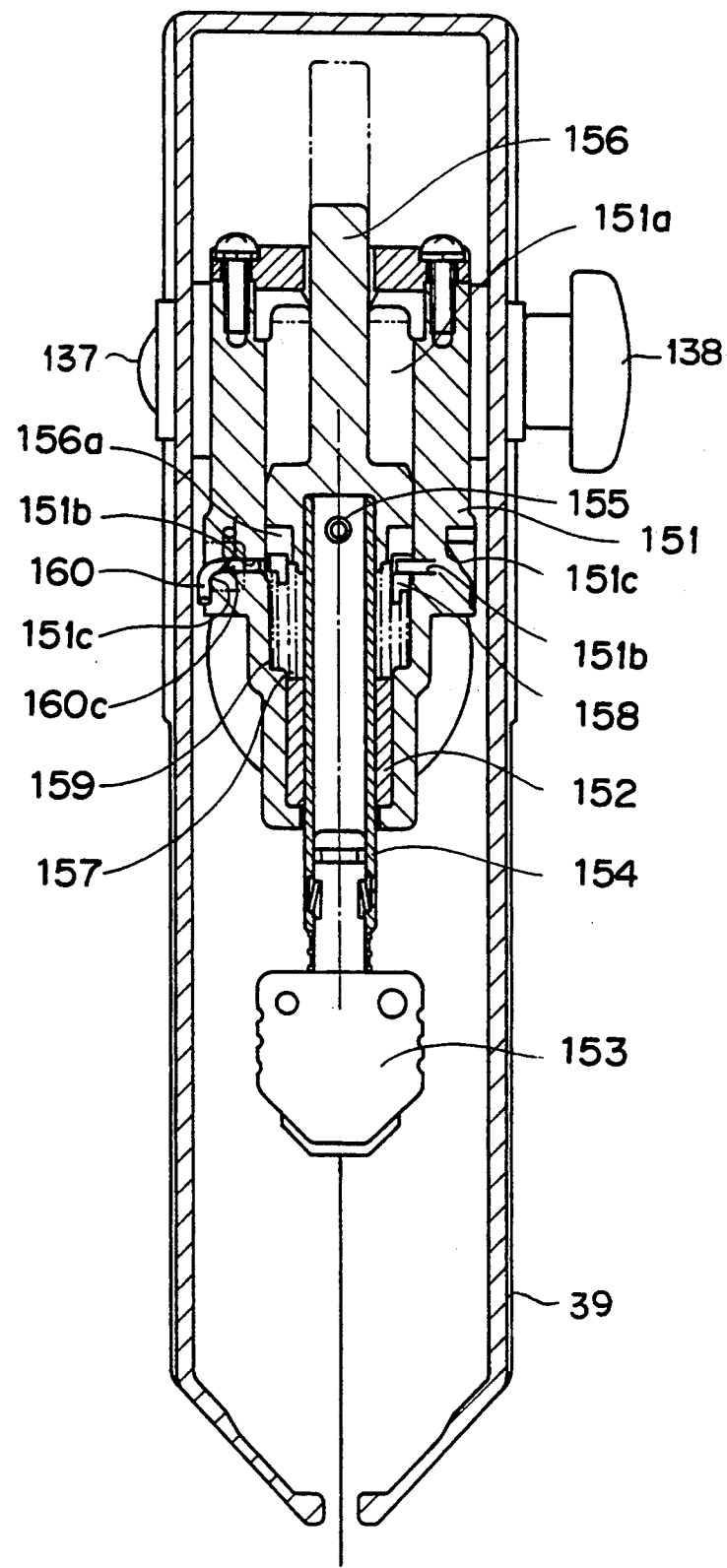
FIG. 18 is an elevational section of a blade holder unit and a tensioning structure of another example.
Figure 20:
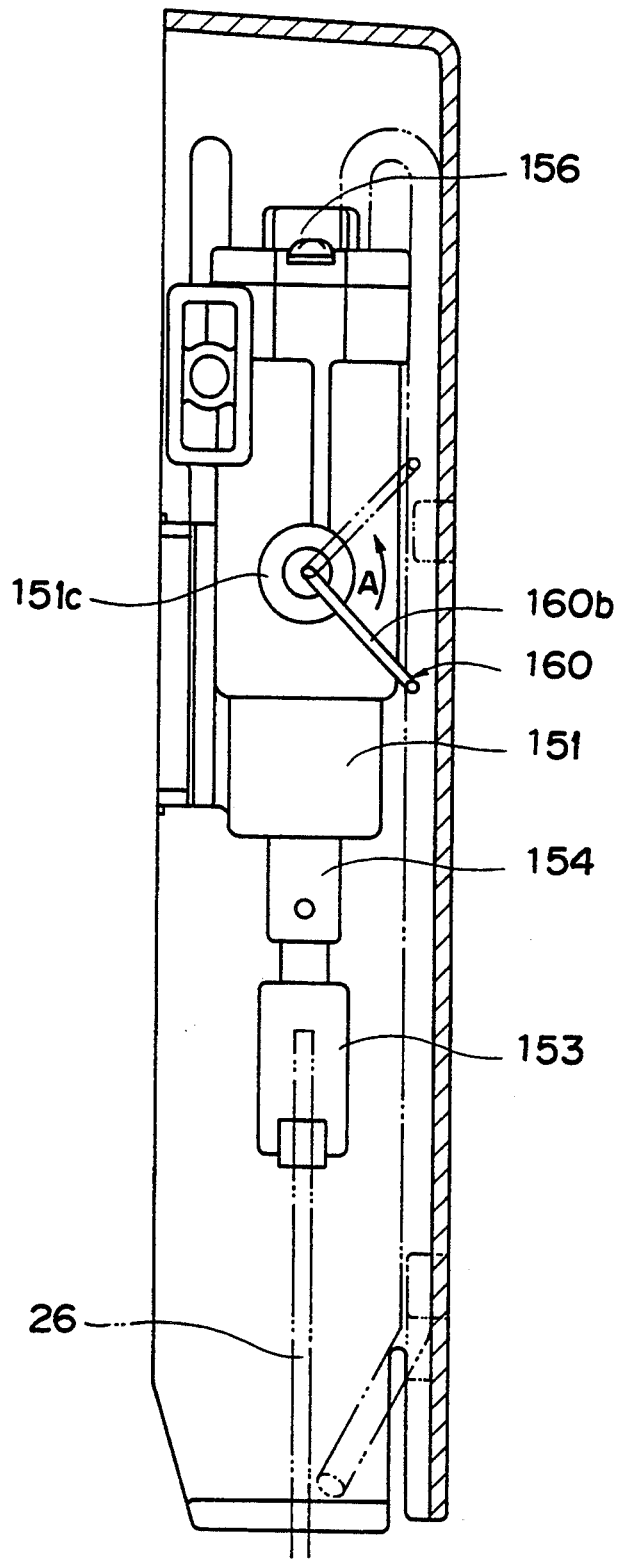
FIG. 20 is a half side view of FIG. 18.

A modified embodiment of the blade tensioning unit is described hereunder with reference to FIGS. 18 to 20.

Reference numeral 151 denotes a slide holder 151, corresponding to the upper slide holder 33 of FIG. 14, and a slide shaft 154, corresponding to the upper slide shaft 34 of FIG. 14, provided at its lower end with a blade holder 153, corresponding to the upper blade holder 36 of FIG. 1, is fitted into the hollow portion Of the slide holder 151 through a metal member 152. A push-holder 155 is fitted into the upper end portion, as viewed, if the slide shaft 154 through a spring pin 155. A coil spring 157 is also interposed between the lower end portion of the push-holder 156 and the metal member 152 to always urge upwardly the push-holder 156. A ring collar 158 is disposed at the lower portion of the push-holder 156, and a coil spring 159 is further interposed between the ring collar 158 and the slide holder 151 to always urge upwardly the ring collar 158 as well as the slide holder 151.

The slide holder 151 is provided with through holes 151b, 151b, communicating the inner hollow portion of the slide holder 151 with external portion. As shown in FIG. 20, the through hole 151b is provided with a cam surface 151c formed on the outer side of the through hole 151b. An operation member 160 is inserted into the through hole 151b, the operation member 160 having a plane shape of FIG. 19. The operation member 160 is composed of an operating portion 160a, cam abutment portions 160b, 160b projecting from both ends of the operating portion 160a, and inserting portions 160c, 160c projecting inwardly, as viewed, from the ends of the cam abutment portions 160b, 160b. The operation member 160 is attached swingably to the slide holder 151 by inserting the inserting portions 160c, 160c into the holes 151c, 151c as shown in FIG. 20. In such engaged state, the cam abutment portions 160b, 160b of the operation member 160 abut against the cam surface portion 151c of the slide holder 151, and accordingly, the inserting portions 160c, 160c are engaged with the hollow portion of the slide holder 151 by the swing motion of the operation member 160.

In FIG. 18, reference numeral 158a denotes a recessed portion so that the inserting portions 160b, 160b of the operation member 160 project into the inner hollow portion 151a of the slide holder 151.

With the structure of the fret-saw blade holding structure, when the blade 26 is urged upward as viewed in FIG. 18 by the urging force of the coil springs 157 and 159, the inserting portions 160c, 160c of the operation member 160 are inserted into the holes 151b, 151b of the slide holder 151. According to this state, as shown in left hand half of FIG. 18, the ring collar 158 abuts against the lower end surface of the push-holder 156, and the push-holder 156 is also urged by the coil spring 159.

In order to prevent the coil spring 159 from acting, the push-holder 156 will be pressed downward, as viewed in FIG. 18, to move the operation member 160 circularly as shown by an arrow A in FIG. 20. According to this motion, the cam abutment surface 160b moves along the cam surface portion 151c and the inserting portion 160c is accommodated in the recessed portion 156a. In this state, the inserting portion 160c is positioned above the ring collar 156; as shown in FIG. 18, and accordingly, as shown in right hand half of FIG. 18, only the urging force of the coil spring 157 is applied to the push-holder 156.

As described above, the structure in which the push-holder 142 (156) slightly projects upward over the slide holder 33 (151) makes it possible to easily attaching the blade to the blade holder by depressing the push-holder.

The tensioning assembly described above may be combined with the holder unit of the aforementioned embodiment without any trouble for performing further improved functions.

In the embodiments of the fret-saw machine described above, the positional adjutment in the axial direction of the two holder units may be easily made by improving the structure of the arm 8 in the following manner.

The arm 8 generally has a U-shaped outer appearance as shown in FIG. 1, 10 or 12 and secured to the support members 7a in the base unit A by penetrating through the holes 7b, 7b formed in the support members 7a, 7a. The arm 8 may be formed a tubular member having a hollow structure.

According to this invention, the arm 8 is secured to the frame 7 at a portion as shown in FIG. 2 by means of a bolt 28. This will be further described with reference to FIGS. 21 and 22.

Figure 21:
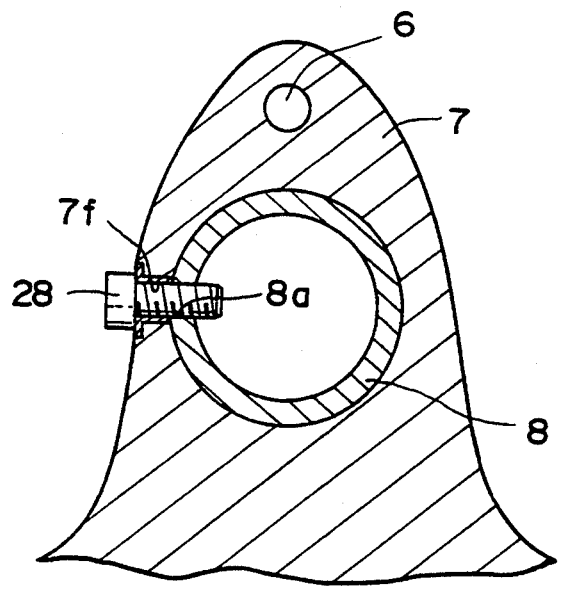
FIG. 21 is a sectional view showing a fastening means for fastening an arm member to a frame member of the fret-saw machine according to this invention for example shown in FIG. 1.

Referring to FIG. 21, being an enlarged view showing fixing manner of the one end side, i.e. lower side as viewed, of the arm 8 to the frame 7 attached to the table 3 of the base unit A, a bolt insertion hole 7f is provided at an appropriate portion of the frame 7, and a bolt insertion hole 8a is also formed in the arm 8 at a corresponding appropriate portion. The bolt insertion hole 7f has an inner diameter larger than an outer diameter of threaded portion of the bolt 28, and the bolt insertion hole 8a is provided with threads. The fixing of the arm 8 to the frame 7 is performed by aligning the insertion hole 7f of the frame 7 and the insertion hole 8a of the arm 8 and inserting the bolt 28 into the holes 7f and 8a from the lefthand side as viewed in FIG. 21.

On the contrary, with respect to the other side end of the arm 8, that is, upper side as viewed, reference will be made to FIGS. 1 and 22.

Referring to FIG. 1, the slide holder 33 is fastened to the upper end portion of the U-shaped arm 8 by means of bolts 31 and 32, and the upper slide shaft 34 is fitted into the inner hollow portion of the slide holder 33 and supported through the metal member 35 so that the lower end of the slide shaft 34 projects downwardy beyond the lower end of the slide holder 33.

Figure 22:
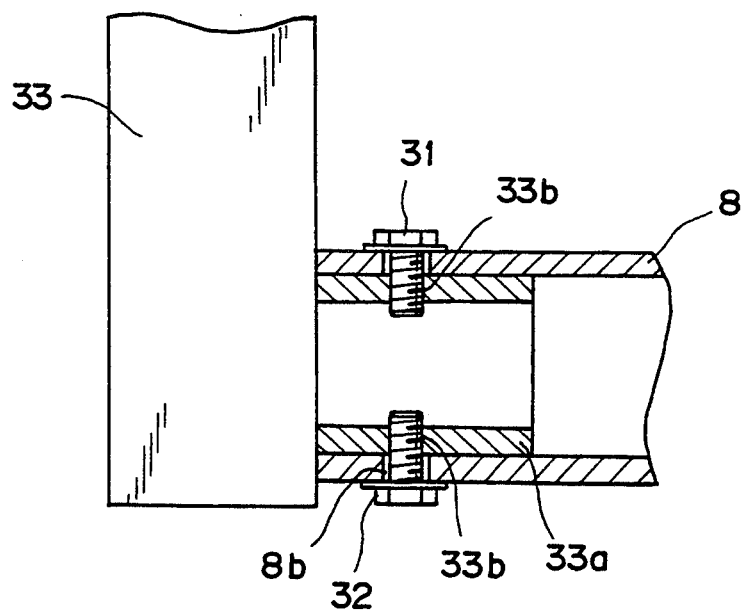
FIG. 22 is a sectional view showing a fastening means, in relation to the fastening means of FIG. 21, for fastening the arm member to a slide holder of the blade holder unit of the fret-saw machine of FIG. 1, for example.

FIG. 22 is an enlarged view of means for fastening the upper end portion of the arm 8 to the slide holder 33, in which a hollow projection member 33a is provided for the side portion of the slide holder 33 and the projection member 33a is fitted into the inner hollow portion of the end portion of the arm 8. Bolt insertion holes 33b are formed in the projection member 338 and bolt insertion holes 8b are also formed in the arm 8 at portions corresponding to the location of the bolt insertion holes 33b of the projection member 33a. The slide holder 33 can be fastened to the arm 8 by inserting the bolts 31 and 32 into the bolt insertion holes 33b and 8b and clamping the same. The bolt insertion hole 8b of the arm is formed so as to have a diameter slightly larger than the outer diameter of the bolt 31 or 32.

According to this embodiment, when it is required to adjut the blade 26 so as to maintain its stretched position, the bolt 28 fastened to the lower half portion of the arm 8 is first loosened. In this operation, since the bolt insertion hole 7f formed in the frame 7 has a diameter slightly larger than the outer diameter of the bolt 28, the arm 8 can be shifted slightly with respect to the frame 7, thus achieving the positional adjustment of the blade 26. Of course, such adjustment will be done in association with the operation of the upper half portion of the arm 8 by means of the bolts 31 and 32.

Furthermore, as shown in FIG. 1, a reinforcing member 8c may be attached to the U-shaped arm 8 and the reinforcing member 8c may be formed by an elongated pipe member plastically deforming the same. The member 8c acts for reinforcing the hollow tubular arm 8.

As briefly described hereinbefore, the fret-saw machine is further provided with a blade cover assembly 39 for safely covering the blade and the members in association therewith. The fret-saw machine according to this invention further includes an embodiment in relation to the blade cover, which will be described hereunder with reference to FIGS. 23 to 25.

Figure 23:
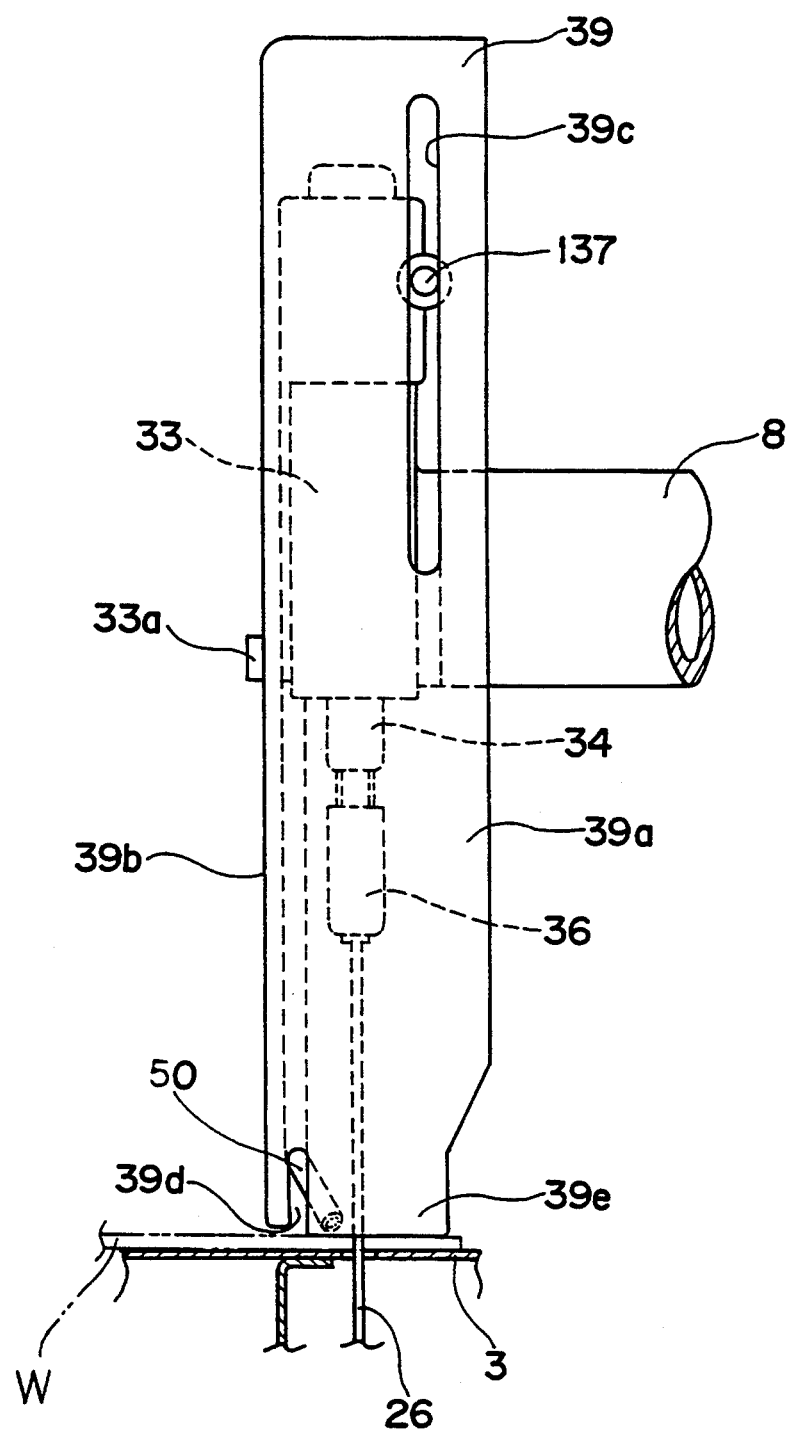
FIG. 23 is a side view of a blade cover applied to the fret-saw machine of FIG. 1, for example.
Figure 24:
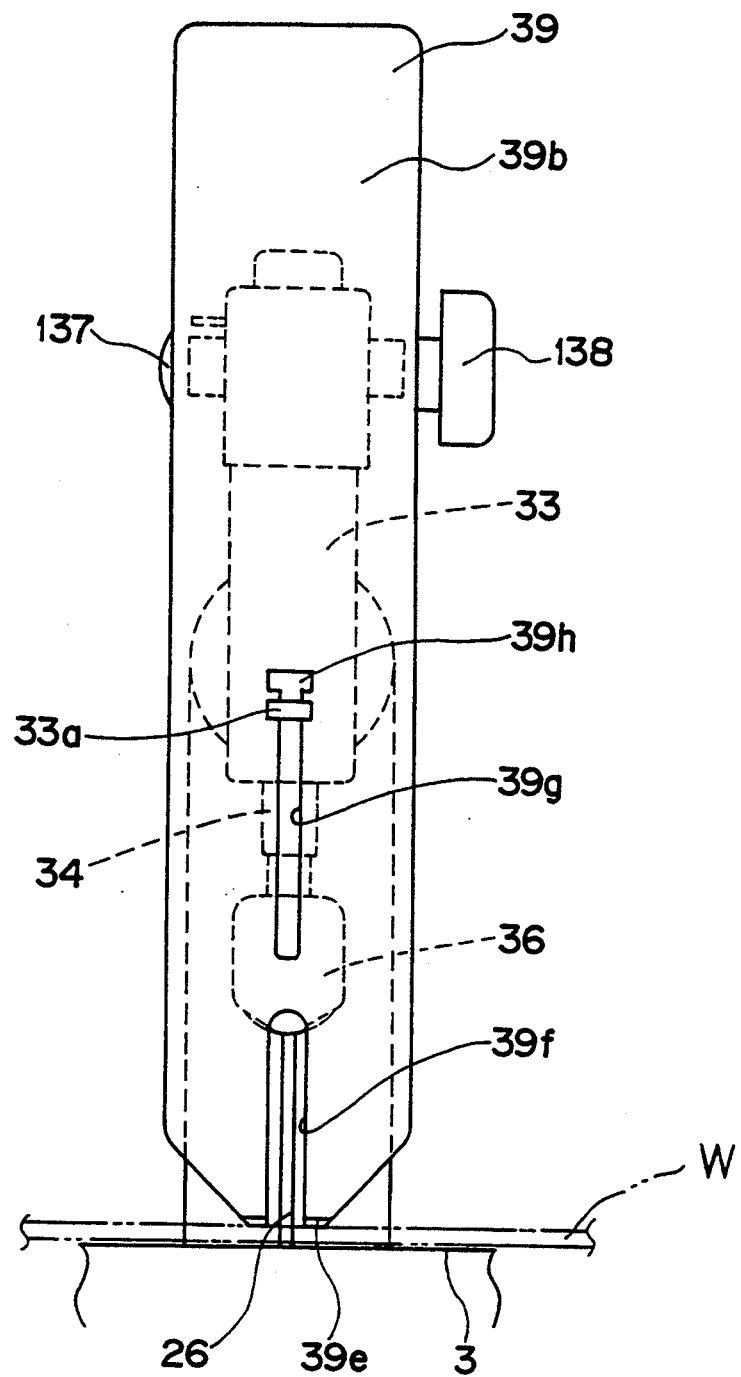
FIG. 24 is e front view of the blade cover of FIG. 23.
Figure 25:
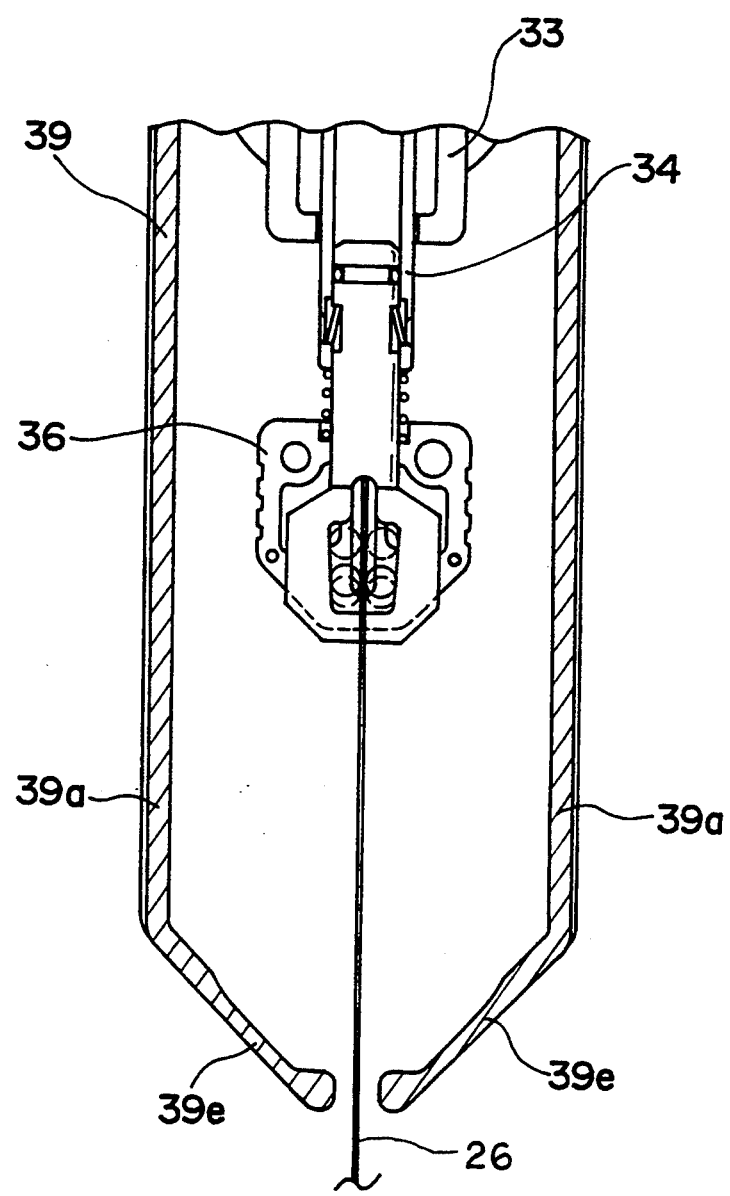
FIG. 25 is an elevational section of the blade cover of FIG. 23.

Referring to FIGS. 23 to 25, the blade cover 39 is formed of a transparent plastic material and composed of two opposing side plates 39a, 39a and a front plate 39b. The side plates 39a, 39a are provided with slits 39c, 39c opposing to each other and extending in a vertical direction as viewed. A bolt 37 is fitted into the slits 39c, 39c. A groove 39d extending vertically is formed in the lower end portion of the side plates 39a, 39a to thereby separate the side plates from the front plate 39b, and the separated portion is formed thin to impart an elastic property to this portion and the separated thin portion is positioned slightly above the surface of the table 3 and acts as a pressing portion 39e for pressing a workpiece W placed on the table 3 of the base unit A as shown in FIG. 25. The pressing portion 39e has an inclination as shown in FIG. 24 towards the blade 26. In FIG. 24, a groove 39f is vertically formed in the lower portion of the front plate 39b so that an operator can observe the positional relationship between the blade 26 and the workpiece W during the cutting operation.

Furthermore, as shown in FIG. 24, a slit 39g extending vertically as viewed is formed at the central portion of the front plate 39b and an escape hole 39h is also formed in continuous with an upper end of the slit 39g. On the other hand, the upper slide holder 33 is provided with a projection 33a at a portion suitable for the engagement of the slit 39g and the hole 39h. The projection 33a is so constructed that it is detachable with respect to the hole 39g but not detachable with respect to the slit 39. The blade cover 39 can be vertically slidably guided in engagement with the projection 33a and the slits 39c and 39g. As described before, the air nozzle 50 for blasting away cut chips by blasting compressed air from the slide holder 33 towards the front end of the blade 26.

It is to be noted that this embodiment of the blade cover can be applied to the embodiments described hereinbefore in combination for achieving an improved effect.

In the actual operation, the nob nut 138 is first loosened to allow the blade cover 39 to move vertically and adjust the attaching height position of the blade cover 39. The blade cover 39 is then fastened by clamping the nob nut 138 at a portion that a gap between the pressing portion 39e of the front plate 39b and the table 3 becomes slightly smaller than a thickness of the workpiece W now placed on the table 3. The reason why the gap is made smaller than the thickness of the workpiece is that the workpiece W at its cut position is pressed against the surface of the table 3 by the elastic force of the pressing portion 39e. Under the condition, the motor 9 is driven to reciprocate the blade 26 to carry out the cutting operation through the operations of the respective blade supporting and holding members and elements described hereinbefore with reference to the embodiment of FIGS. 1 to 3, for example.

The blade 26 is attached or removed by the following manner. The nob nut 138 is loosened and the blade cover 39 is made vertically, as viewed in FIG. 24, movable. When the projection 33a of the upper slide holder 33 aligns in position with the escape hole 39h of the blade cover 39 during the vertical movement thereof, the blade cover 39 is rotated in a clockwise direction about the bolt 137 as shown in FIG. 23, whereby the projection 33a disengages from the escape hole 39h, thus the blade cover 39 being rotated. Under this condition, an operator can remove or exchange the exposed blade 26 by handling the blade holder 36 also exposed. Thereafter, the blade cover 39 is rotated in a counter-clockwise direction and the projection 33a of the slide holder 33 is engaged with the escape hole 39e of the blade cover 39. After the engagement, the rotation of the blade cover 39 can be prevented by the slide engagement of the projection 33a with the slit 39g.

FIGS. 26 to 29 represent another embodiment of the blade cover of a fret-saw machine for covering a fret-saw blade. First, referring to FIG. 26, the fret-saw machine comprises a base unit 201 including a table on which a workpiece to be cut is placed, a U-shaped arm 202 having one end secured to a frame member disposed in the base unit 201, and another end positioned above the base unit 201, and a holder unit 203 attached to another end of the arm 202. To the holder unit 203 is attached an upper blade holder unit 204, and a lower blade holder unit is accommodated in the base unit 201. A blade 205 is stretched between the upper and lower blade holder units and driven by a drive means also disposed in the base unit 201. The blade 205 and associated members are covered by e blade cover 206. The members and units other than the blade cover 206 and its associated members have substantially the same structure as those shown in FIGS. 1 to 3, so that the details thereof are now omitted.

Figure 27:
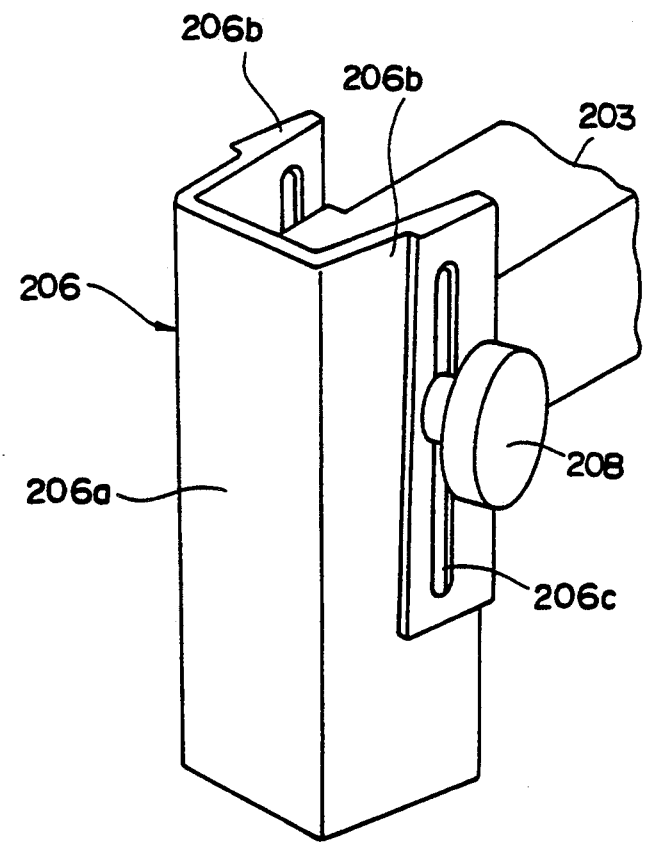
FIG. 27 is a perspective view of the blade cover of FIG. 26.

Referring to FIG. 27, the blade cover 206 is composed of a front plate 206a and side plates 206b, 206b formed integrally with the side ends of the front plate 206a so as to provide substantially a box shape in cross section. The free ends of the side plates 206b, 206b extend slightly outward so as to separate from each other. Slits 206c, 206c are formed to the side plates 206b, 206b so as to oppose to each other and extend vertically as viewed. One of the slits is provided with an engaging portion 206d which is engaged with a stud 207a of a bolt 207, the stud 207a having a square cross section.

Figure 28:
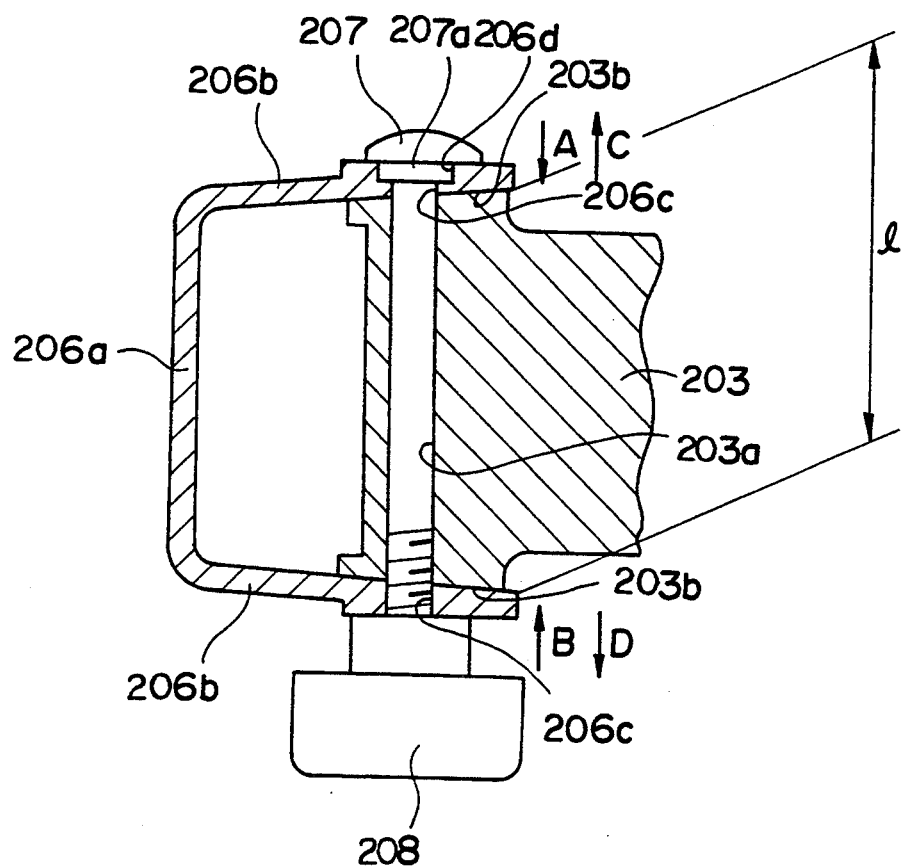

As shown in FIG. 28, the holder unit 203 is provided at its front end side with a through hole 203a and the front end of the holder unit 203 is inserted into the box shaped space between the front plate 206a and the side plates 206b of the blade cover 206, i.e. from the right side to the left side as viewed so that the through hole 203a of the holder unit 203 aligns with the slits 206c, 206c of the side plates of the blade cover 206. The bolt 207 is then inserted into the thus aligning hole from the side of the slit 206c which is provided with the engaging portion 206d to prevent the rotation of the bolt 207. A nob nut 208 is screwed to the head of the bolt 207 to thereby fasten the blade cover 206 to the holder unit 203. In this meaning, the bolt 207 and the nob nut 208 will constitute a fastening assembly. Further, it may be necessary to form the front end portion of the holder unit 203 as abutting surfaces 203b, 203b so that at least one of the abutting surfaces has a taper shape corresponding to the slightly widened inner surfaces of the side plates 206b, 206b. The length of the opening of the side plates 206b, 206b is slightly widened the front end portion of the holder unit 203 is inserted and engaged, whereby when the holder unit 203 is fitted to the blade cover 206, the holder unit 203 can be firmly snapped by the side plates 206c, 206c.

Figure 26:
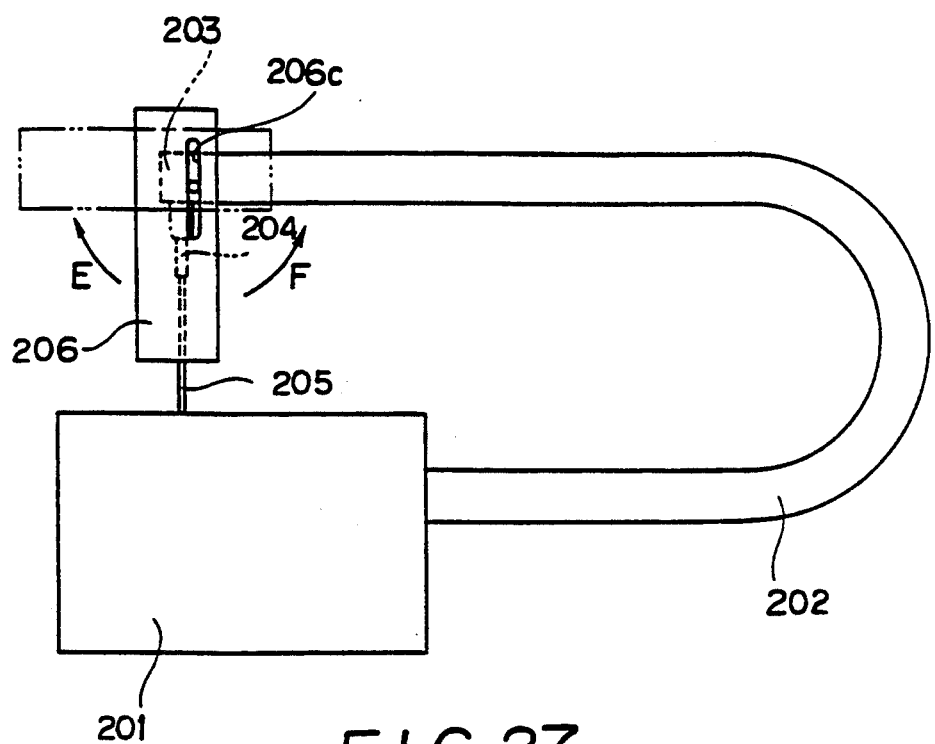
FIG. 26 is an illustration of a fret-saw machine to which another embodiment of a blade cover is applied.

When the blade cover 206 of the structure described above is fastened to the holder unit 203, the rotation thereof in directions E and F in FIG. 26 is prevented. Namely, when the blade cover 206 is rotated, it is necessary for the side plates 206c, 206c to be moved in directions C and D in FIG. 28, but this movement is prevented by the engagement of the bolt 207 with the nob nut 208, thus preventing the blade cover 206 from being rotated in the directions E and F, thus preventing the erroneous rotation of the blade cover 206 during the cutting operation of the fret-saw machine.

In a case where the blade cover 206 is opened for exchanging the blade 205, for example, the nob nut 208 is first loosened to allow the side plates 206b, 206b, to move in the direction C and D, and the blade cover 206 is then rotated while widening the side plates 206b, 206b. The blade cover 206 is again firmly held by its elastic property at a position rotated by a predetermined angle.

In modified examples, the fastening assembly may be composed of a nob bolt. The front abutting surfaces of the holder unit 203 may be formed in taper which is widened forwardly towards the front plate 206a when inserted. The abutting surfaces may be otherwise formed so as to be tapered vertically as viewed in a case where the slits 206c, 206c are eliminated.

In the foregoing descriptions, various embodiments and modified examples were described with respect to various elements, units and members of the fret-saw machine, but these embodiments and examples may be combined in the actual fret-saw machine without troublesome or complicated workings, and many other changes and modifications may be further made without departing from the appended claims.

What is claimed is:

1. A fret-saw machine comprising:
   a base unit having a table on which a workpiece to be cut is placed;
   a frame member disposed in the base unit and secured to the table;
   a U-shaped arm member having one end portion secured to the frame member and another end portion disposed above the table;
   a blade holder means having first and second slide holder units and first and second blade holder units, each of the blade holder units being respectively secured to a corresponding slide holder unit, the first slide holder unit and the first blade holder unit being disposed in the base unit and secured to the frame member and the second slide holder unit and the second blade holder unit being secured to the end portion of the arm member; said blade holder means being arranged with an inclination with respect to a surface of the table;
   a blade having first and second opposed ends, said blade being supported at its ends by the first and second blade holder units said blade being held substantially perpendicularly with respect to the surface of the table; and
   a drive means supported in the base unit by the frame member and connected to the first slide holder unit to drive the blade,
   said blade and said blade holder means being arranged so that when said blade carries out a cutting operation, said blade moves in one direction towards the table in cutting engagement with the workpiece and also moves in another direction away from the table while being spaced apart from the workpiece all the while maintaining the blade substantially perpendicular to the surface of the table.

2. A fret-saw machine according to claim 1, wherein said first blade holder unit and said first slide holder unit are secured to the frame member with an inclination and said second blade holder unit and said second slide holder unit are secured to the arm member with an inclination, both inclinations having same angle with respect to the surface of the table.

3. A fret-saw machine according to claim 1, wherein said blade has both ends fitted into said first and second blade holder units, said both ends being bent so as to extend axially with respect to the first and second blade holder units when fitted and wherein at least one of said first and second blade holder units comprises a holder having a blade insertion hole and an inner hollow portion communicated with the blade insertion hole, two rolling members disposed in the hollow portion of the holder between which an end portion of the blade is clamped, a shaft portion formed on a side opposite to the blade insertion hole, the shaft portion being inserted into a slide shaft secured to corresponding one of first and second slide holders, and an operation means disposed to be axially movable with respect to the holder for supporting the rolling members so as to be shifted towards or away from each other in a direction normal to the axial direction, said inner hollow portion having a pair of tapered surfaces contacting the two rolling members, respectively, the tapered surfaces being axially widened towards the shaft portion.

* * * * *